US008326316B2

(12) United States Patent
Ogoro

(10) Patent No.: US 8,326,316 B2
(45) Date of Patent: Dec. 4, 2012

(54) PORTABLE WIRELESS TERMINAL AND MOVING VELOCITY DETECTING METHOD FOR PORTABLE WIRELESS TERMINAL

(75) Inventor: Kazuo Ogoro, Tokyo (JP)

(73) Assignee: NEC Corporation, Tokyo (JP)

( * ) Notice: Subject to any disclaimer, the term of this patent is extended or adjusted under 35 U.S.C. 154(b) by 987 days.

(21) Appl. No.: 11/910,169

(22) PCT Filed: Mar. 31, 2006

(86) PCT No.: PCT/JP2006/306835
§ 371 (c)(1),
(2), (4) Date: Sep. 28, 2007

(87) PCT Pub. No.: WO2006/106918
PCT Pub. Date: Oct. 12, 2006

(65) Prior Publication Data
US 2009/0075678 A1    Mar. 19, 2009

(30) Foreign Application Priority Data

Mar. 31, 2005   (JP) .................................. 2005-101198

(51) Int. Cl.
*H04W 24/00* (2009.01)

(52) U.S. Cl. ........... 455/456.1; 342/357.29; 342/357.43; 342/357.57; 342/418

(58) Field of Classification Search ............... 455/456.6, 455/456.1; 342/357.43, 357.57, 418, 357.29; 701/213
See application file for complete search history.

(56) References Cited

U.S. PATENT DOCUMENTS

| 5,774,829 A * | 6/1998 | Cisneros et al. ............... 701/213 |
| 6,061,021 A * | 5/2000 | Zibell ........................... 342/418 |
| 6,166,685 A * | 12/2000 | Soliman .................... 342/357.29 |
| 6,246,361 B1 * | 6/2001 | Weill et al. ................. 342/357.57 |
| 6,330,452 B1 * | 12/2001 | Fattouche et al. ........... 455/456.1 |
| 7,864,108 B2 * | 1/2011 | Kurata ...................... 342/357.43 |

FOREIGN PATENT DOCUMENTS

| JP | 06-130143 A | 5/1994 |
| JP | 06-224828 A | 8/1994 |
| JP | 07-111675 A | 4/1995 |
| JP | 2669288 B2 | 7/1997 |

(Continued)

*Primary Examiner* — William D Cumming
(74) *Attorney, Agent, or Firm* — Sughrue Mion, PLLC

(57) ABSTRACT

A portable wireless terminal and a moving velocity detecting method for the portable wireless terminal capable of detecting a moving velocity with high accuracy without increasing power consumption and terminal cost are provided. At the start of a communication, GPS reception-related circuits 32 and 33 are turned on, an initial position of a portable wireless terminal 10 is detected, a RAKE receiver 24 and a synchronous detector 25 measure Doppler shift amounts of down signals at a known frequency received from a plurality of base stations, respectively, and a CPU 41 calculates relative velocities of the portable wireless terminal 10 to the respective base stations and obtains a current moving velocity of the portable wireless terminal 10 from positions of the base stations, the initial position, and the relative velocities. The current position is calculated from the initial position and the current moving velocity, and sequentially updated to be used in place of the initial position at the time of calculating the moving velocity next time. The initial position at the start of the communication may be obtained by using a W-LAN, an RFID system, a wireless IC card or user input information instead of using a GPS.

22 Claims, 7 Drawing Sheets

FOREIGN PATENT DOCUMENTS

| | | |
|---|---|---|
| JP | 10-261989 A | 9/1998 |
| JP | 10-290474 A | 10/1998 |
| JP | 11-083529 A | 3/1999 |
| JP | 11-098071 A | 4/1999 |
| JP | 11-201765 A | 7/1999 |
| JP | 11-220774 A | 8/1999 |
| JP | 3019800 B2 | 1/2000 |
| JP | 2001-215268 A | 8/2001 |
| JP | 2001-359145 A | 12/2001 |
| JP | 2002-027522 A | 1/2002 |
| JP | 2002-071802 A | 3/2002 |
| JP | 2002-116248 A | 4/2002 |
| JP | 2002-152808 A | 5/2002 |
| JP | 2002-250765 A | 9/2002 |
| JP | 2002-261846 A | 9/2002 |
| JP | 2003-070055 A | 3/2003 |
| JP | 2004-015518 A | 1/2004 |
| JP | 2004-104223 A | 4/2004 |
| JP | 2004-364167 A | 12/2004 |
| WO | WO 98/14796 A2 | 4/1998 |
| WO | 2004/021585 A2 | 3/2004 |

\* cited by examiner

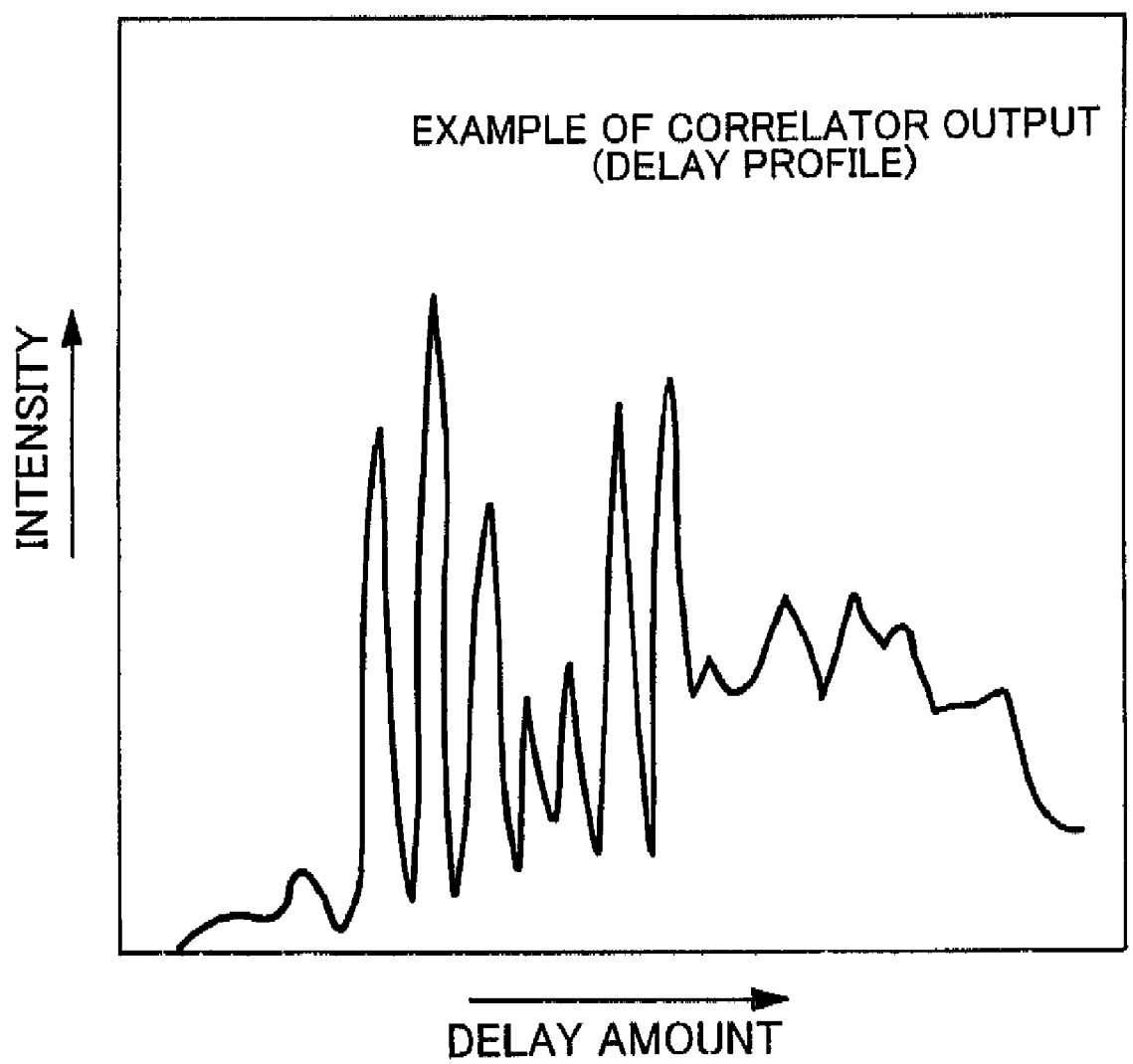

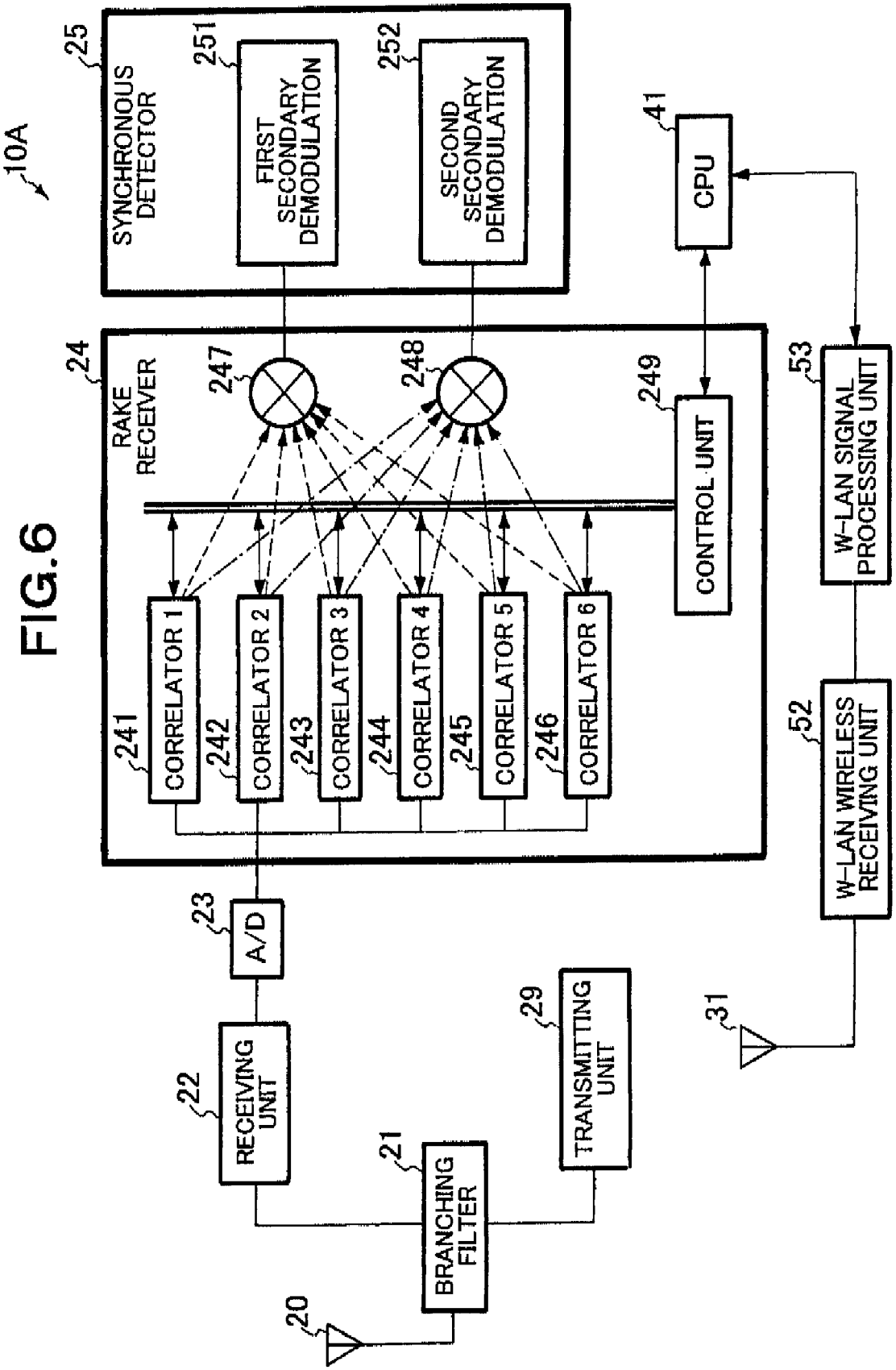

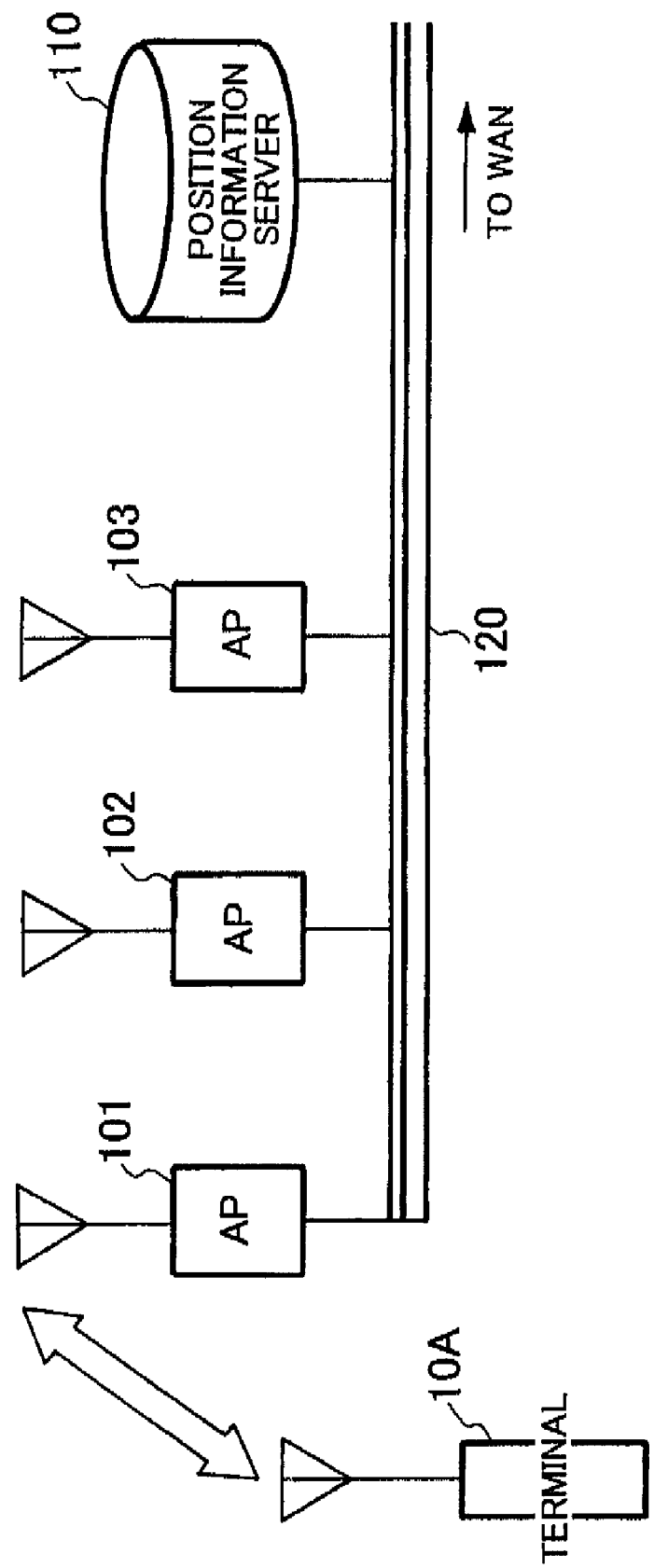

PORTABLE WIRELESS TERMINAL AND MOVING VELOCITY DETECTING METHOD FOR PORTABLE WIRELESS TERMINAL

TECHNICAL FIELD

The present invention relates to a portable wireless terminal and a moving velocity detecting method for the portable wireless terminal. The present invention is particularly suitably applied to a portable wireless terminal including a function to change setting information on a wireless communication system connected to the portable wireless terminal according to a moving velocity of the portable wireless terminal.

BACKGROUND ART

Currently, portable wireless terminals typified by a W-CDMA (Wideband Code Division Multiple Access) comfortable with 3GPP (3rd Generation Partnership Project) standard or a so-called third generation portable telephone have been put to practical use. The W-CDMA is a so-called CDMA (Code Division Multiple Access) system that establishes a communication using the spread spectrum technique. As compared with a conventional second generation portable telephone system such as a PDC (Personal Digital Cellular) telephone, the W-CDMA has such advantages as a large channel accommodation capacity and a high transmission rate. Due to this, advanced nations in which frequency resources are tight and high value added communications are required have competed to introduce the W-CDMA terminals.

Differently from the second generation portable telephone, even if a W-CDMA terminal communicates with a base station in a cell adjacent to a cell in which the W-CDMA terminal is present, then the W-CDMA terminal can communicate with the adjacent other base station with the same frequency by changing a spreading code that is a feature of a CDMA communication without need to change the frequency. Due to this, the W-CDMA terminal can easily access a plurality of base stations simultaneously, simultaneously connect to the base stations by lines, and secure a communication line without interruption. It is thereby possible to realize hand-over without intermittent sound or so-called "soft hand-over" even during the hand-over for switching a communication destination from one base station to another base station during moving of the W-CDMA terminal among the cells.

Meanwhile, it is important for the W-CDMA terminal to grasp a moving velocity of the terminal so as to improve communication quality for the following reasons. In a RAKE receiver employed in a W-CDMA terminal, an internal correlator (a searcher) searches delay profiles of incoming waves including reflected waves from the respective base stations, and finds and gives weights to several strong incoming waves, a secondary demodulator in rear of the searcher decodes data on the weighted strong incoming waves, and the decoded data is used for reception.

A delay profile strongly depends on a reception environment of each mobile station. Although the delay profile basically remains unchanged in a stationary state, the incoming wave is greatly changed by multipaths according to moving locations in a moving state.

Due to this, in the moving state as compared with the stationary state, it is necessary to allow the searcher to always operate and to accelerate a following velocity of the searcher if the moving velocity of the terminal is higher. Nevertheless, to accelerate the following velocity of the searcher means to increase a calculation amount of a searcher-related circuit. From viewpoints of power consumption saving, it is desirable to reduce the calculation amount to an appropriate amount when the moving velocity is low.

Moreover, multipaths change greatly in the moving state as compared with the stationary state. Accordingly, it is necessary to reduce averaging processes performed when each delay profile is calculated in the moving state. On the other hand, since multipaths do not change in the stationary state, it is desirable to increase the averaging processes so as to suppress the influence of noise and the like.

Furthermore, since the multipaths do not change in the stationary state, it is preferable to allocate the strongest incoming wave to each finger. However, in the moving state, new incoming waves such as reflected waves arrive in succession because of the change of moving points whereas the incoming waves that have been strong previously gradually weaken with passage of time. Therefore, in some cases, as the incoming wave allocated to each finger, it is appropriate to select not the strongest incoming wave but an incoming wave that is currently weak but is gradually intensified.

Generally, there is a limit to the number of fingers. Due to this, different algorithms are used to determine to which fingers the numerous incoming waves are to be allocated, depending on environmental conditions such as the moving velocity stated above. Therefore, it is important to grasp the moving velocity of the portable wireless terminal so as to satisfy both low power consumption and improvement of communication quality. In these circumstances, several methods of detecting the moving velocity have been proposed conventionally.

The first example of the conventional techniques for measuring a moving velocity is disclosed in JP-A-7-111675 identified herein as Patent Document 1 and entitled "method and device of positioning mobile object and mobile communication system using the same". The Patent Document 1 proposes the following technique. A portable wireless terminal transmits a radio wave with a predetermined frequency first. Next, a plurality of base stations receives the radio wave transmitted from the portable wireless terminal. The radio wave received by each of the base stations includes Doppler shift resulting from movement of the portable wireless terminal. A moving direction and a moving velocity of the mobile body are estimated from a spatial distribution status of Doppler shift amounts detected at the respective base stations.

The second example of the conventional techniques is disclosed in JP-A-10-261989 identified herein as Patent Document 2 and entitled "portable telephone device". The Patent Document 2 proposes the following portable wireless terminal. A portable wireless terminal observes an electric field (hereinafter, "field") level of a received signal during diversity reception and detects a fading frequency (f) from a temporal change of the field level. It is known that a correlation of $f=V/\lambda$ is held among this fading frequency, a wavelength ($\lambda$) of the received signal, and a moving velocity (V) of the portable wireless terminal. The moving velocity (V) is calculated using this relational expression.

The third example of the conventional techniques is disclosed in JP-A-11-98071 identified herein as Patent Document 3 and entitled "CDMA mobile wireless terminal device". The Patent Document 3 proposes a technique for calculating a Doppler frequency caused by fading from a spreading width of a carrier frequency of a received signal from each base station, and for calculating a moving velocity of the CDMA mobile wireless terminal device from the carrier frequency and the Doppler frequency.

The fourth example of the conventional techniques is disclosed in JP-2669288 identified herein as Patent Document 4 and entitled "microcell/integrated microcell mobile communication system". The Patent Document 4 proposes the following technique. First, a plurality of base stations transmits wireless control channel signals to a portable wireless terminal in a time division fashion. Next, the portable wireless terminal in a waiting state measures received field levels of the wireless control channels from the respective base stations, and estimates its moving velocity from changing speeds of the received field levels of the wireless control channels from the respective base stations.

The fifth example of the conventional techniques is disclosed in JP-A-2004-104223 identified herein as Patent Document 5 and entitled "portable communication terminal and method of detecting moving velocity of portable communication terminal". The Patent Document 5 proposes the following technique. A portable communication terminal estimates its position from field levels of received signals or the like in advance, and calculates its moving direction and its moving velocity from the position information and Doppler shifts included in the signals from respective base stations.

The sixth example of the conventional techniques is disclosed in JP-3019800 identified herein as Patent Document 6 and entitled "portable telephone set". The Patent Document 6 proposes the technique for detecting a moving velocity of a portable wireless terminal using a gyroscope installed in the portable wireless terminal.

The seventh example of the conventional techniques is disclosed in JP-A-2002-261846 identified herein as Patent Document 7 and entitled "Doppler frequency estimating apparatus, wireless device, and Doppler frequency estimating method". The Patent Document 7 proposes the technique for calculating a Doppler frequency from a phase fluctuation and a field intensity (C/N) of a received signal with respect to a pilot symbol, and for calculating a moving velocity of a wireless device.

The eighth example of the conventional techniques is disclosed in JP-A-2004-15518 identified herein as Patent Document 8 and entitled "method of switching wireless channel connections in mobile wireless system". The Patent Document 8 proposes the technique for constantly measuring a position of each mobile station using GPS (Global Positioning System), and for calculating a moving direction and a moving velocity of a mobile wireless system.

Patent Document 1: JP-A-7-111675 (page 18, FIG. 17).
Patent Document 2: JP-A-10-261989 (page 3, FIG. 2)
Patent Document 3: JP-A-11-98071 (page 4, FIG. 1)
Patent Document 4: JP-2669288 (pages 3-4, FIG. 2)
Patent Document 5: JP-A-2004-104223 (pages 5-6, FIG. 2)
Patent Document 6: JP-3019800 (page 3, FIG. 1)
Patent Document 7: JP-A-2002-261846 (pages 3-4, FIG. 1)
Patent Document 8: JP-A-2004-15518 (page 3, FIG. 1)

DISCLOSURE OF THE INVENTION

As already stated above, the detection of the moving velocity of the portable wireless terminal is an important technique. However, the first problem with the conventional techniques is that no method of accurately detecting the moving velocity is present. This is because systems and environments actually used do not satisfy conditions assumed in the conventional techniques.

According to the Patent Document 1 described as the first example of the conventional techniques, for example, the portable wireless terminal is considered to be moving in a direction connecting a maximum relative velocity and a minimum relative velocity using many and uniformly distributed base stations on a flat surface. It is considered that the accuracy for estimating the moving direction by this conventional technique is almost similar to an angle obtained by dividing 360 degrees by the number of base stations visible from the portable wireless terminal (that is, the number of base stations within a communication area of the portable wireless terminal) according to the seventeenth paragraph and FIGS. 6, 17 and the like of the Patent Document 1. However, in an actual portable telephone system, so many base stations as those shown in FIG. 17 are hardly visible but only a few base stations are visible. In this case, the accuracy for estimating the moving direction is quite naturally low, with the result that the accuracy for estimating the moving velocity is low accordingly.

Furthermore, according to the Patent Document 2 described as the second example of the conventional techniques, the moving velocity is estimated using the statistical relationship that the correlation between a fading pitch and the moving velocity is constant. However, the cause of the fading is the interference among reflected waves from buildings or the like. Due to this, an obtained velocity value may possibly be largely deviated from a true value depending on a state in which standing waves are present in space. For example, in an area in which the number of buildings is small, the visibility is good, and fewer reflected waves are present, fading occurs less frequently. In an urban area which is forested with buildings and in which many reflected waves are present, the fading pitch is narrower than that of the relational expression. In such an area environment, the accuracy for estimating the moving velocity is deteriorated.

According to the Patent Document 3 described as the third example of the conventional techniques, the Doppler frequency is estimated by measuring a spreading distribution of the carrier frequency caused by the influence of the fading as described in the 44th paragraph of the Patent Document 3. However, the spreading of the carrier frequency due to the fading is statistical, so that it is difficult to obtain an accurate value by short-time measurement and irregularities are large. Besides, as stated above, in the environment in which the base stations are visible, fewer buildings are built, the visibility is good, and fewer reflected waves are present, fading occurs less frequently and cannot often detected.

According to the Patent Document 4 described in the fourth example of the conventional techniques, the moving velocity is estimated from speeds at which intensities of the received field levels from the respective base stations change (decrease or increase). Due to this, if the portable wireless terminal is not at a location where antennas of the respective base stations are visible, it is difficult to make the measurement itself. Besides, because of the influence of fading and the like, it is considered to make an accurate measurement difficult. As a result, the estimation accuracy is deteriorated instead in the urban area in which the probability of presence of an actual user is high.

According to the Patent Document 5 described as the fifth example of the conventional techniques, it is necessary for the portable wireless terminal to estimate its position in advance. However, to acquire the position information, the field levels of the received signals or the like are used. For the similar reason to that in relation to the Patent Document 4, it is considered to be difficult to estimate the moving velocity with high accuracy because of the influence of the fading or the like.

According to the Patent Document 7 described as the seventh example of the conventional techniques, the accuracy for calculating the Doppler frequency depends on the received field intensity (C/N) with respect to the pilot symbol. As a result, the Doppler frequency cannot be calculated with high accuracy if the mobile wireless terminal is not at the location where the antennas of the respective base stations are visible.

The second problem with the conventional techniques is an increase in power consumption. The reason is as follows. For example, the Patent Document 5 described as the fifth example of the conventional techniques discloses, as another embodiment, calculating the position of the terminal using the GPS (Global Positioning System) similarly to the Patent Document 8 described as the eighth example of the conventional techniques instead of using the field levels of the received signals. If the GPS is used, it is necessary to cause a GPS receiving unit to continue operating throughout the communication. This is a great disadvantage for the portable wireless terminal intended to save current consumption as much as possible.

Furthermore, according to the Patent Document 6 described as the sixth example of the conventional techniques, for example, the gyroscope is employed to detect the moving velocity. It is necessary to cause the gyroscope to continue operating during the communication. This is a great disadvantage for the portable wireless terminal intended to be provided at a price as low as possible and to be made small in size.

The third problem with the conventional techniques is cost increase due to complicated terminal configuration. According to the Patent Document 6 described as the sixth example of the conventional techniques, for example, the gyroscope is employed to detect the moving velocity. It is necessary to install the gyroscope that is not necessary to install normally so as to detect the moving velocity. This is a great disadvantage for the portable wireless terminal intended to be provided at a price as low as possible and to be made small in size.

As can be understood, it is difficult for the conventional techniques to detect the moving velocity with high accuracy without greatly influencing the configuration of the portable wireless terminal and the power consumption.

It is an object of the present invention to detect the moving velocity with high accuracy and provide a portable wireless terminal capable of realizing improved communication performance by using a moving velocity detected highly accurately.

It is another object of the present invention to detect a moving velocity without making terminal configuration large in scale and without increasing power consumption.

To solve the above-stated problems, a portable wireless terminal and a method of detecting a moving velocity of the portable wireless terminal according to the present invention adopt the following characteristic constitutions.

(1) A portable wireless terminal comprising means for obtaining a current moving velocity of the portable wireless terminal from base station position information indicating installation positions of a plurality of base stations, respectively, from initial position information indicating an initial position of the portable wireless terminal at start of a communication, and from information on relative velocities of the portable wireless terminal to the respective base stations.

(2) The portable wireless terminal according to (1) above, comprising means for calculating current position information on the portable wireless terminal from the current moving velocity of the portable wireless terminal and the initial position information, for obtaining the current moving velocity of the portable wireless terminal from the base station information, from the information on the relative velocities, and from the calculated current position information in place of the initial position information, for newly calculating thereafter a current position whenever the current moving velocity is obtained, and for updating previous current position information to new current position information to use the updated current position information to calculate the moving velocity next time during the communication of the portable wireless terminal.

(3) The portable wireless terminal according to (2) above, comprising means for, if the previous current position information is to be updated to the new current position information whenever the current moving velocity is obtained and the updated current position information is to be used to calculate the moving velocity the next time, recalculating the current position of the portable wireless terminal as the initial position information whenever predetermined time passes, whenever a moving distance from the initial position reaches a predetermined threshold value or at a predetermined frequency according to the calculated moving velocity or required calculation accuracy similarly to the start of the communication, and for calculating the current moving velocity of the portable wireless terminal from the recalculated initial position information in place of the updated current position information, from the base station information, and from the information on the relative velocities during the communication of the portable wireless terminal.

(4) The portable wireless terminal according to any one of (1) to (3), comprising means for calculating Doppler effects of down signals from the respective base stations using information obtained by a demodulator of a receiving unit included in the portable wireless terminal, and for obtaining the information on the relative velocities of the portable wireless terminal to the respective base stations as means for obtaining the information on the relative velocities of the portable wireless terminal to the respective base stations.

(5) The portable wireless terminal according to any one of (1) to (3), comprising means for using information on a phase rotation velocity of a phase modulation symbol point obtained by a demodulator of a receiving unit included in the portable wireless terminal as means for obtaining the information on the relative velocities of the portable wireless terminal to the respective base stations.

(6) The portable wireless terminal according to any one of (1) to (3), comprising means for causing a CDMA receiving unit included in the portable wireless terminal to demodulate down signals from the respective base stations, and for calculating the information on the relative velocities of the portable wireless terminal to the respective base stations from state changes of delay profiles of the down signals as means for obtaining the information on the relative velocities of the portable wireless terminal to the respective base stations.

(7) The portable wireless terminal according to any one of (1) to (6), comprising means for changing a parameter set to a wireless unit responsible for the communication based on the information indicating a current state of the portable wireless terminal obtained by the means for obtaining the current moving velocity of the portable wireless terminal.

(8) The portable wireless terminal according to any one of (1) to (7), comprising means for using base station characteristic information capable of uniquely identifying the respective base stations as means for obtaining the base station position information indicating the installation positions of the respective base stations.

(9) The portable wireless terminal according to any one of (1) to (7), comprising means for transmitting an inquiry signal to the base stations currently communicating with the portable wireless terminal as means for obtaining the base station position information indicating the installation positions of the respective base stations.

(10) The portable wireless terminal according to any one of (1) to (9), comprising means operating at a designated time as a time for obtaining the initial position, for receiving a GPS (Global Positioning System) signal as means for obtaining the initial position information on the portable wireless terminal.

(11) The portable wireless terminal according to any one of (1) to (9), comprising means operating at a designated time as a time for obtaining the initial position, for receiving position information on an access point from a wireless LAN system as means for obtaining the initial position information on the portable wireless terminal.

(12) The portable wireless terminal according to any one of (1) to (9), comprising means operating at a designated time as a time for obtaining the initial position, for receiving a wireless signal from an RFID (Radio Frequency Identification) system or a wireless IC card as means for obtaining the initial position information on the portable wireless terminal.

(13) The portable wireless terminal according to any one of (1) to (12), comprising means for using information input by a user of the portable wireless terminal as means for obtaining the initial position information on the portable wireless terminal.

(14) A method of detecting a moving velocity of a portable wireless terminal, comprising obtaining a current moving velocity of the portable wireless terminal from base station position information indicating installation positions of a plurality of base stations, respectively, from initial position information indicating an initial position of the portable wireless terminal at start of a communication, and from information on relative velocities of the portable wireless terminal to the respective base stations.

(15) The method of detecting a moving velocity of a portable wireless terminal according to (14), comprising means for calculating current position information on the portable wireless terminal from the current moving velocity of the portable wireless terminal and the initial position information, for obtaining the current moving velocity of the portable wireless terminal from the base station information, from the information on the relative velocities, and from the calculated current position information in place of the initial position information, for newly calculating thereafter a current position whenever the current moving velocity is obtained, and for updating previous current position information to new current position information to use the updated current position information to calculate the moving velocity next time during the communication of the portable wireless terminal.

(16) The method of detecting a moving velocity of a portable wireless terminal according to (15), comprising, if the previous current position information is to be updated to the new current position information whenever the current moving velocity is obtained and the updated current position information is to be used to calculate the moving velocity the next time, recalculating the current position of the portable wireless terminal as the initial position information whenever predetermined time passes, whenever a moving distance from the initial position reaches a predetermined threshold value or at a predetermined frequency according to the calculated moving velocity or required calculation accuracy similarly to the start of the communication, and calculating the current moving velocity of the portable wireless terminal from the recalculated initial position information in place of the updated current position information, from the base station information, and from the information on the relative velocities during the communication of the portable wireless terminal.

(17) The method of detecting a moving velocity of a portable wireless terminal according to any one of (14) to (16), comprising calculating Doppler effects of down signals from the respective base stations using information obtained by a demodulator of a receiving unit included in the portable wireless terminal, and obtaining the information on the relative velocities of the portable wireless terminal to the respective base stations as means for obtaining the information on the relative velocities of the portable wireless terminal to the respective base stations.

(18) The method of detecting a moving velocity of a portable wireless terminal according to any one of (14) to (16), comprising obtaining the information on the relative velocities of the portable wireless terminal to the respective base stations using information on a phase rotation velocity of a phase modulation symbol point obtained by a demodulator of a receiving unit included in the portable wireless terminal.

(19) The method of detecting a moving velocity of a portable wireless terminal according to any one of (14) to (16), comprising causing a CDMA receiving unit included in the portable wireless terminal to demodulate down signals from the respective base stations, and calculating the information on the relative velocities of the portable wireless terminal to the respective base stations from state changes of delay profiles of the down signals.

(20) The method of detecting a moving velocity of a portable wireless terminal according to any one of (14) to (19), comprising changing a parameter set to a wireless unit responsible for the communication based on the information indicating a current state of the portable wireless terminal obtained.

(21) The method of detecting a moving velocity of a portable wireless terminal according to any one of (14) to (20), comprising obtaining position information indicating the installation positions of the respective base stations by using base station characteristic information capable of uniquely identifying the respective base stations or by transmitting an inquiry signal to the base stations currently communicating with the portable wireless terminal so as to obtain the position information indicating the installation positions of the respective base stations.

(22) The method of detecting a moving velocity of a portable wireless terminal according to any one of (14) to (21), comprising obtaining the initial position information by causing to operate at a designated time as a time for obtaining the initial position for receiving a GPS (Global Positioning System) signal to either receive position information on an access point from a wireless LAN system or receive a wireless signal from an RFID (Radio Frequency Identification) system or a wireless IC card and/or by using information input by a user of the portable wireless terminal so as to obtain the initial position information on the portable wireless terminal.

EFFECT OF THE INVENTION

The portable wireless terminal and the method of detecting a moving velocity of the portable wireless terminal according to the present invention can exhibit the following advantages.

The first advantage of the present invention is that the moving velocity of the portable wireless terminal can be detected with high accuracy. This is because the relative velocity is calculated based on a down signal from each base station and a velocity vector is calculated based on a current position and the relative velocity of the portable wireless terminal.

The second advantage of the present invention is that the moving velocity can be detected without making the configuration of the portable wireless terminal large in scale and without increasing power consumption. This is because there is no need to use extra or additional circuits by using information acquired from a receiving unit, e.g., a demodulator of a CDMA receiving unit for detection of the moving velocity, and because the initial position detection means is allowed to operate intermittently only when it is necessary.

The third advantage of the present invention is that the communication performance of the portable wireless terminal, e.g., W-CDMA wireless terminal can be improved by using the velocity detected with high accuracy by the above-stated means.

BRIEF DESCRIPTION OF THE DRAWINGS

FIG. 5 is a graph showing an example of a delay profile acquired by a searcher;

FIG. 6 is a block configuration diagram showing another example of the internal configuration of the portable wireless terminal according to the present invention; and FIG. 7 is a schematic diagram showing a network configuration of a W-LAN system including the portable wireless terminal according to the present invention.

Figure 1:
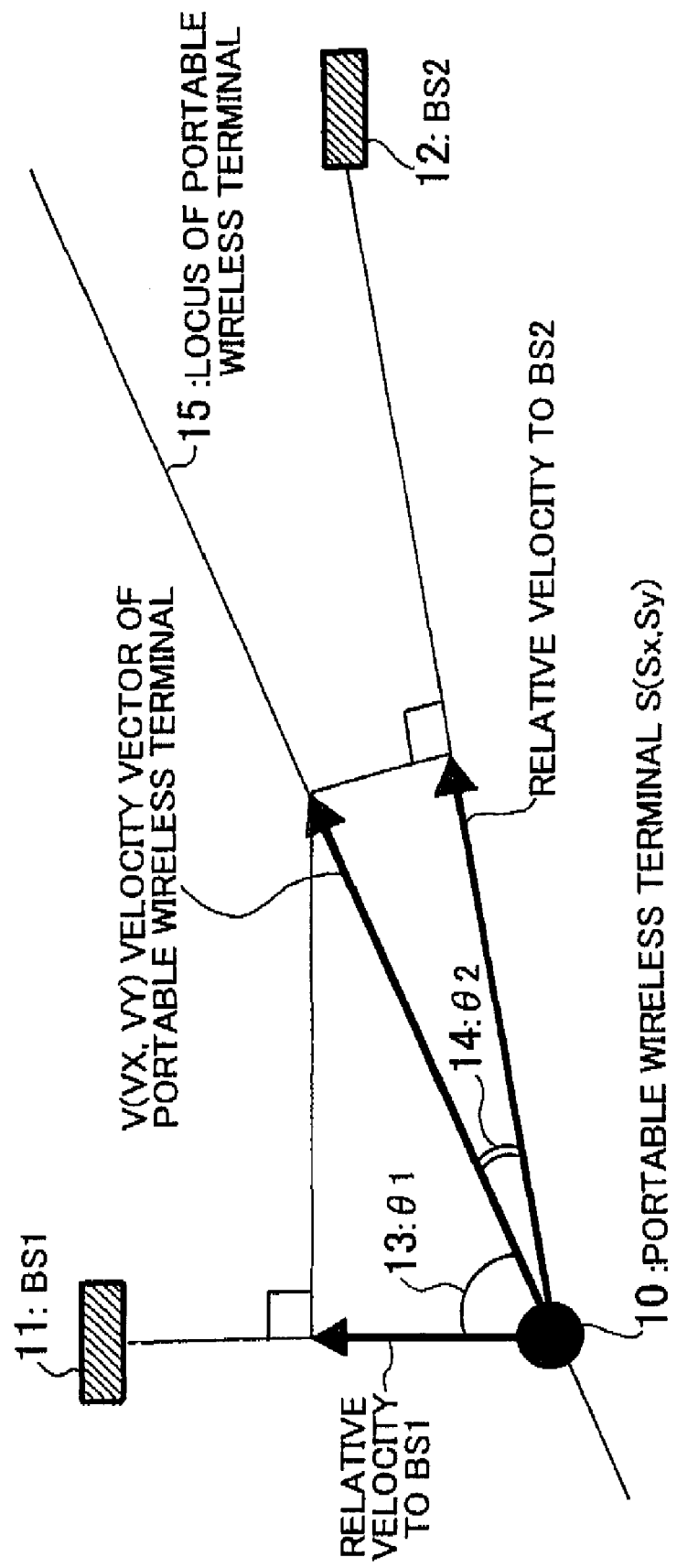
FIG. 1 is a pattern diagram typically showing the relationship between a portable wireless terminal according to the present invention and base stations while the portable wireless terminal is in an operating state.

DESCRIPTION OF REFERENCE NUMERALS 10, 10A portable wireless terminal
101 first access point
102 second access point
103 third access point
11 first base station
110 position information server
12 second base station
120 LAN
13 elevation angle with respect to first base station
14 elevation angle with respect to second base station
15 movement locus
20 antenna
21 branching filter
22 receiving unit
23 A/D converter
24 RAKE receiver
241 first correlator
242 second correlator
243 third correlator
244 fourth correlator
245 fifth correlator
246 sixth correlator
247 first weight adder
248 second weight adder
249 control unit
25 synchronous detector
251 first secondary demodulator
252 second secondary demodulator
29 transmitting unit
31 GPS antenna
32 GPS radio receiving unit
33 GPS signal processing unit
41 CPU
51 W-LAN antenna
52 W-LAN wireless unit
53 W-LAN signal processing unit

BEST MODE FOR CARRYING OUT THE INVENTION

Example 1

A portable wireless terminal including means for obtaining a current moving velocity of the portable wireless terminal from base station position information indicating installation positions of a plurality of base stations, respectively, from initial position information indicating an initial position of the portable wireless terminal at start of a communication, and from information on relative velocities of the portable wireless terminal to the respective base stations.

Example 2

The portable wireless terminal according to Example 1 above, including means for calculating current position information on the portable wireless terminal from the current moving velocity of the portable wireless terminal and the initial position information, for obtaining the current moving velocity of the portable wireless terminal from the base station information, from the information on the relative velocities, and from the calculated current position information in place of the initial position information, for newly calculating thereafter a current position whenever the current moving velocity is obtained, and for updating previous current position information to new current position information to use the updated current position information to calculate the moving velocity next time during the communication of the portable wireless terminal.

Example 3

The portable wireless terminal according to Example 2 above, including means for, if the previous current position information is to be updated to the new current position information whenever the current moving velocity is obtained and the updated current position information is to be used to calculate the moving velocity the next time, recalculating the current position of the portable wireless terminal as the initial position information whenever predetermined time passes, whenever a moving distance from the initial position reaches a predetermined threshold value or at a predetermined frequency according to the calculated moving velocity or required calculation accuracy similarly to the start of the communication, and for calculating the current moving velocity of the portable wireless terminal from the recalculated initial position information in place of the updated current position information, from the base station information, and from the information on the relative velocities during the communication of the portable wireless terminal.

Example 4

The portable wireless terminal according to any one of Examples 1 to 3, including means for calculating Doppler effects of down signals from the respective base stations using information obtained by a demodulator of a receiving unit included in the portable wireless terminal, and for obtaining the information on the relative velocities of the portable wireless terminal to the respective base stations as means for obtaining the information on the relative velocities of the portable wireless terminal to the respective base stations.

Example 5

The portable wireless terminal according to any one of Examples 1 to 3, including means for using information on a phase rotation velocity of a phase modulation symbol point obtained by a demodulator of a receiving unit included in the portable wireless terminal as means for obtaining the information on the relative velocities of the portable wireless terminal to the respective base stations.

Example 6

The portable wireless terminal according to any one of Examples 1 to 3, including means for causing a CDMA receiving unit included in the portable wireless terminal to demodulate down signals from the respective base stations, and for calculating the information on the relative velocities of the portable wireless terminal to the respective base stations from state changes of delay profiles of the down signals as means for obtaining the information on the relative velocities of the portable wireless terminal to the respective base stations.

Example 7

The portable wireless terminal according to any one of Examples 1 to 6, including means for changing a parameter set to a wireless unit responsible for the communication based on the information indicating a current state of the portable wireless terminal obtained by the means for obtaining the current moving velocity of the portable wireless terminal.

Example 8

The portable wireless terminal according to any one of Examples 1 to 7, including means for using base station characteristic information capable of uniquely identifying the respective base stations as means for obtaining the base station position information indicating the installation positions of the respective base stations.

Example 9

The portable wireless terminal according to any one of Examples 1 to 7, including means for transmitting an inquiry signal to the base stations currently communicating with the portable wireless terminal as means for obtaining the base station position information indicating the installation positions of the respective base stations.

Example 10

The portable wireless terminal according to any one of Examples 1 to 9, including means operating at a designated time as a time for obtaining the initial position, for receiving a GPS (Global Positioning System) signal as means for obtaining the initial position information on the portable wireless terminal.

Example 11

The portable wireless terminal according to any one of Examples 1 to 9, including means operating at a designated time as a time for obtaining the initial position, for receiving position information on an access point from a wireless LAN system as means for obtaining the initial position information on the portable wireless terminal.

Example 12

The portable wireless terminal according to any one of Examples 1 to 9, comprisingincluding means operating at a designated time as a time for obtaining the initial position, for receiving a wireless signal from an RFID (Radio Frequency Identification) system or a wireless IC card as means for obtaining the initial position information on the portable wireless terminal.

Example 13

The portable wireless terminal according to any one of Examples 1 to 12, including means for using information input by a user of the portable wireless terminal as means for obtaining the initial position information on the portable wireless terminal.

Example 14

A method of detecting a moving velocity of a portable wireless terminal, including obtaining a current moving velocity of the portable wireless terminal from base station position information indicating installation positions of a plurality of base stations, respectively, from initial position information indicating an initial position of the portable wireless terminal at start of a communication, and from information on relative velocities of the portable wireless terminal to the respective base stations.

Example 15

The method of detecting a moving velocity of a portable wireless terminal according to Example 14, including means for calculating current position information on the portable wireless terminal from the current moving velocity of the portable wireless terminal and the initial position information, for obtaining the current moving velocity of the portable wireless terminal from the base station information, from the information on the relative velocities, and from the calculated current position information in place of the initial position information, for newly calculating thereafter a current position whenever the current moving velocity is obtained, and for updating previous current position information to new current position information to use the updated current position information to calculate the moving velocity next time during the communication of the portable wireless terminal.

Example 16

The method of detecting a moving velocity of a portable wireless terminal according to Example 15, including, if the previous current position information is to be updated to the new current position information whenever the current moving velocity is obtained and the updated current position information is to be used to calculate the moving velocity the next time, recalculating the current position of the portable wireless terminal as the initial position information whenever predetermined time passes, whenever a moving distance from the initial position reaches a predetermined threshold value or at a predetermined frequency according to the calculated moving velocity or required calculation accuracy similarly to the start of the communication, and calculating the current moving velocity of the portable wireless terminal from the recalculated initial position information in place of the updated current position information, from the base station information, and from the information on the relative velocities during the communication of the portable wireless terminal.

Example 17

The method of detecting a moving velocity of a portable wireless terminal according to any one of Examples 14 to 16, including calculating Doppler effects of down signals from the respective base stations using information obtained by a demodulator of a receiving unit included in the portable wireless terminal, and obtaining the information on the relative velocities of the portable wireless terminal to the respective base stations as means for obtaining the information on the relative velocities of the portable wireless terminal to the respective base stations.

Example 18

The method of detecting a moving velocity of a portable wireless terminal according to any one of Examples 14 to 16, including obtaining the information on the relative velocities of the portable wireless terminal to the respective base stations using information on a phase rotation velocity of a phase modulation symbol point obtained by a demodulator of a receiving unit included in the portable wireless terminal.

Example 19

The method of detecting a moving velocity of a portable wireless terminal according to any one of Examples 14 to 16, including causing a CDMA receiving unit included in the portable wireless terminal to demodulate down signals from the respective base stations, and calculating the information on the relative velocities of the portable wireless terminal to the respective base stations from state changes of delay profiles of the down signals.

Example 20

The method of detecting a moving velocity of a portable wireless terminal according to any one of Examples 14 to 19, including changing a parameter set to a wireless unit responsible for the communication based on the information indicating a current state of the portable wireless terminal obtained.

Example 21

The method of detecting a moving velocity of a portable wireless terminal according to any one of Examples 14 to 20, including obtaining position information indicating the installation positions of the respective base stations by using base station characteristic information capable of uniquely identifying the respective base stations or by transmitting an inquiry signal to the base stations currently communicating with the portable wireless terminal so as to obtain the position information indicating the installation positions of the respective base stations.

Example 22

The method of detecting a moving velocity of a portable wireless terminal according to any one of Examples 14 to 21, including obtaining the initial position information by causing to operate at a designated time as a time for obtaining the initial position for receiving a GPS (Global Positioning System) signal to either receive position information on an access point from a wireless LAN system or receive a wireless signal from an RFID (Radio Frequency Identification) system or a wireless IC card and/or by using information input by a user of the portable wireless terminal so as to obtain the initial position information on the portable wireless terminal.

The base stations connected to the portable wireless terminal 10 are identified based on the frequencies of the down signals, spreading codes, and base station IDs (BS-IDs: Base Station Identification) as well as base station specific information capable of uniquely identifying the base stations, and positions of the base stations are obtained. The positions can be obtained by transmitting an inquiry signal to each of the base stations that are holding a communication with the portable wireless terminal 10 and transmitting a notification from a network or holding the position information in the portable wireless terminal 10 as a table in advance and referring to the table.

To facilitate description, the position information will be described below while assuming the position information as XY orthogonal coordinate systems. Actually, the position information is replaced by parameters representing a latitude and a longitude or the other ground position of each base station. If it is assumed that a coordinate of the current position of the portable wireless terminal 10 is (Sx, Sy), a relative position vector from the current position S to the first base station 11 and that from the current position S to the second base station 12 are as follows, respectively.

$$\overline{SA}(SA_x, SA_y)$$

$$\overline{SB}(SB_x, SB_y) \quad (2)$$

Furthermore, a moving velocity vector of the portable wireless terminal 10 is assumed as follows.

$$\overline{v}(v_x, v_y) \quad (3)$$

On this assumption, the relative velocities v1 and v2 to the first base station 11 and the second base station 12 are as follows, respectively as stated above.

$$V_1 = V \cdot \cos \theta_1$$

$$V_2 = V \cdot \cos \theta_2 \quad (4)$$

where $v = |\overline{v}| = \sqrt{V_x^2 + V_y^2}$

Moreover, inner products between the relative position vectors from the current position S to the first and second base stations 11 and 12 and the moving velocity vector of the portable wireless terminal 10 are calculated as expressed as follows.

$$\overline{SA} \cdot \overline{v} = |\overline{SA}| \cdot |\overline{v}| \cos \theta_1$$

$$\overline{SB} \cdot \overline{v} = |\overline{SB}| \cdot |\overline{v}| \cos \theta_2 \quad (5)$$

These equations are expanded in the orthogonal coordinate system as follows.

$$SA_x \cdot v_x + SA_y \cdot v_y = \overline{SA} \cdot v_1$$

$$SB_x \cdot v_x + SB_y \cdot v_y = \overline{SB} \cdot v_2 \quad (6)$$

The moving velocity vectors vx and vy are calculated from these equations as follows.

$$v_x = \frac{SA_y \cdot \overline{SB} \cdot v_2 - SB_y \cdot \overline{SA} \cdot v_1}{SA_y \cdot SB_x - SA_x \cdot SB_y} \quad (7)$$

$$v_y = \frac{SB_x \cdot \overline{SA} \cdot v_1 - SA_x \cdot \overline{SB} \cdot v_2}{SA_y \cdot SB_x - SA_x \cdot SB_y}$$

The moving velocity vector v(vx, vy) of the portable wireless terminal 10 are obtained from a phase rotation velocity of the symbol point in the demodulators of the receiving unit (the RAKE receiver 24 and the synchronous detector 25).

The CPU 41 can improve a receiving performance of a W-CDMA receiving unit, i.e., wireless unit by setting the parameters changed according to the obtained moving vector to the RAKE receiver 24 and the like.

The process of calculating the moving vector is repeated during a communication, particularly during a conversation. However, since the current position of the portable wireless terminal 10 changes according to the movement of the portable wireless terminal 10, moving vector values are more inaccurate accordingly. Therefore, by performing a calculation represented by the following equations, a current position S'(Sx', Sy') is always updated to a latest state and the updated current position is used as a current position in place of the initial position S obtained at the time of starting the communication for calculating the moving velocity next time.

$$S'_x = S_x + v_x \cdot dt$$

$$S'_y = S_y + v_y \cdot dt \quad (8)$$

It is to be noted that S'(Sx', Sy') denotes the current position of the portable wireless terminal 10, S(Sx, Sy) denotes the position when the previous velocity of the portable wireless terminal 10 is detected, and that dt denotes a time interval for measuring the velocity v of the portable wireless terminal 10.

However, if the current position is continuously corrected by this method, errors are accumulated. It is, therefore, desirable to measure the current position again using the GPS or the like with the current position set as the initial position when a preset time passes if the communication prolongs. This can be realized by causing the CPU 41 to control the GPS wireless receiving unit 32 and the GPS signal processing unit 33 that do not always operate to operate if desired so as to reacquire the current position.

Moreover, the above-stated frequency of reacquiring the initial position can be set to a preset position according to required calculation accuracy or the calculated moving velocity (e.g., in proportion to the moving velocity) or can be set whenever a moving distance from the initial position reaches a predetermined threshold value. For example, when the velocity is high, by frequently reacquiring and updating the initial position, it is possible to avoid a situation of continuously calculating the moving velocity while a current position error remains large and to expect a highly accurate result.

Furthermore, since there is normally no need to supply current to the GPS wireless receiving unit 32 and the GPS signal processing unit 33, current consumption can be suppressed from becoming higher than that according to the conventional techniques.

As stated so far, the portable wireless terminal 10 according to this embodiment grasps the current position at the time of starting the communication and the current position updated if desired, grasps the positions of a plurality of base stations, and receives the down signals from the respective base stations, thereby making it possible to always calculate the moving velocity during the communication with high accuracy. Due to this, optimum parameters can be set to the wireless units and the portable wireless terminal 10 can fulfill its maximum performance. Furthermore, it suffices that the communication signal transmitting and receiving units, e.g., the basic constituent elements of the CDMA terminal mainly operate as the hardware caused to operate during the conversation. Therefore, power consumption can be reduced.

Figure 2:
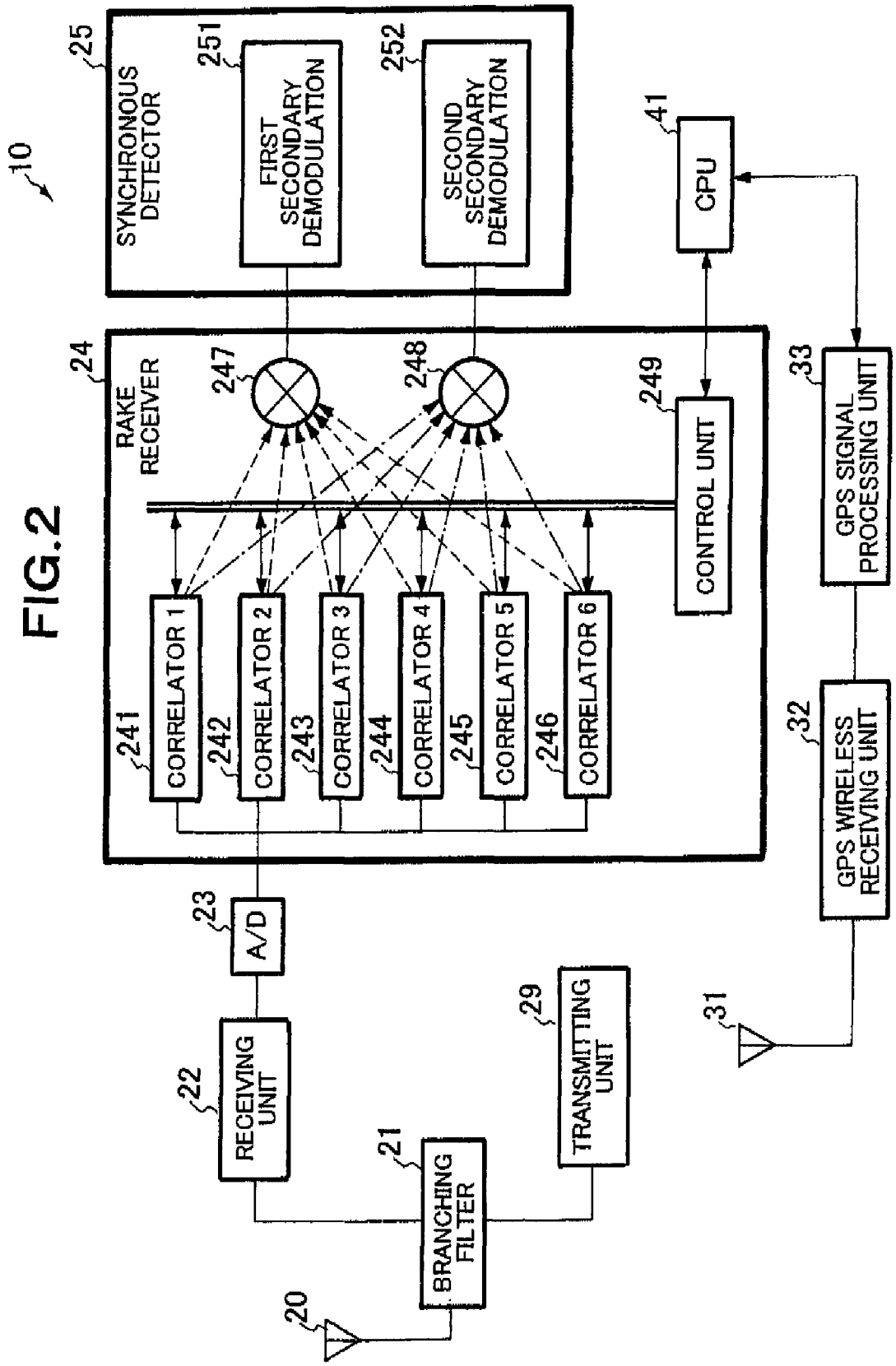
FIG. 2 is a block configuration diagram showing an example of an internal configuration of the portable wireless terminal according to the present invention.

Additionally, the portable wireless terminal 10 according to this embodiment can update the current position used to calculate the moving velocity next time by the means (i.e., the GPS antenna 31, the GPS wireless receiving unit 32, and the GPS signal processing unit 33 shown in FIG. 2) operating only at designated periods and detecting the current position of the portable wireless terminal 10 as the initial position, the means (i.e., the RAKE receiver 24 and the synchronous detector 25 shown in FIG. 2) detecting Doppler shift amounts of the received waves from a plurality of base stations (i.e., the first and second base stations 11 and 12 shown in FIG. 1) and detecting the relative velocities to the respective base stations, and calculating the present moving velocity (including the moving direction) and multiplying the initial position by the present moving velocity based on the position information characteristic of the respective base stations and the detected initial position relative velocities. According to this embodiment, therefore, once the initial position is calculated at the start of a communication, a highly accurate position can be sequentially calculated whenever the moving velocity is calculated, and the moving velocity can be detected with high accuracy based on the calculated position. Moreover, if the communication prolongs, the accurate current position is redetected using the means for detecting the initial position as desired, whereby it is possible to prevent errors of the position used to calculate the moving velocity from being accumulated.

(Second Embodiment)

A second embodiment of the present invention will be described. The second embodiment is identical with the first embodiment except for a unit of detecting relative velocities to respective base stations. Therefore, only the unit of detecting relative velocities to respective base stations will be described.

In the internal configuration shown in FIG. 2 as the first embodiment, a down signal arriving at the portable wireless terminal 10 from each of the base stations is input to the RAKE receiver (CDMA receiving unit) 24. The received down signal is input first to the first correlator 241 operating as the searcher. The first correlator 241 calculates a correlation between the digital signal and a predetermined spreading code and acquires a delay profile of the digital signal. A parameter according to the delay wave is set to the second to sixth correlators 242 to 246 assigned as fingers, the respective fingers calculate and detect incoming waves based on peak correlations. Thereafter, the first weight adder 247 and the second weight adder 248 add weights to the peak correlations and input despread outputs to the first secondary demodulator 251 and the second secondary demodulator 252, respectively.

FIG. 5 shows a typical example of the delay profile acquired by the searcher. As shown in FIG. 5, if a vertical axis is a field intensity axis indicating a received field level and a horizontal axis is a time axis indicating a delay amount, a waveform of the field intensity having peaks corresponding to the respective reflected waves is obtained as the delay profile.

This delay profile is a direct reflection of multipaths on which the portable wireless terminal 10 receives signals with respect to the intensity and delay time. Due to this, the delay profile changes temporally according to the movement of the portable wireless terminal 10. Since data on the delay profile can be measured with a resolution of a primary modulation chip rate used for despreading, it can be measured with quite high accuracy. For example, if the data is measured at a chip rate of 3.84 Mcps (mega chip per second), the resolution is 260 ns (nano seconds).

When the mobile body is closer to the base station, the delay amount decreases. Therefore, the peaks of the correlations shown in FIG. 4 move leftward on the time axis. Alternatively, when the mobile body is farther from the base station, the peaks move in opposite direction. By capturing moving amounts of the correlation peaks on the time axis, the relative velocity to the base station can be calculated.

By using the relative velocity acquired from this delay profile, the moving velocity and the current position of the portable wireless terminal can be obtained similarly to the first embodiment.

(Third Embodiment)

A third embodiment of the present invention will be described. The third embodiment is identical with the first and second embodiments except for a unit detecting the initial position of the portable wireless terminal 10. Therefore, only the unit detecting the initial position of the portable wireless terminal 10 will be described.

(Description of Configuration)

FIG. 6 is a block diagram showing a different example of the internal configuration of the portable wireless terminal according to the present invention from the example shown in FIG. 2, and is a block configuration diagram showing the third embodiment. A portable wireless terminal 10A shown in FIG. 6 includes a circuit unit as that of a W-CDMA portable wireless terminal similarly to the portable wireless terminal 10 shown in FIG. 10. Differently from FIG. 2, a W-LAN antenna 51, a W-LAN wireless unit 52, and a W-LAN signal processing unit 53 are installed in the portable wireless terminal 10A in place of the GPS reception-related units shown in FIG. 2 as a W-LAN (Wireless Local Area Network) system constituting a wireless communication network. The W-LAN antenna 51, the W-LAN wireless unit 52, and the W-LAN signal processing unit 53 operate only at designated time.

FIG. 7 is a schematic network configuration diagram of a W-LAN system including the portable wireless terminal 10A according to the present invention, and shows a connection configuration according to the third embodiment.

The W-LAN system shown in FIG. 7 is configured so that a first access point (AP) 101 transmitting and receiving W-LAN wireless signals, a second access point 102, a third access point 103, and a position information server 110 storing therein information on positions of the respective access points are connected to a wired LAN 120. The LAN 120 is also connected to an external network WAN (Wide Area Network) (not shown). The access points AP are appropriately located in stations, buildings, companies, houses and the like. The position information server 110 holds characteristic information for identifying the respective access points, and includes a function to transmit the position information on a relevant access point when receiving an inquiry.

(Description of Operation)

Referring to FIGS. 6 and 7, an operation for detecting a moving velocity of the portable wireless terminal 10A shown in FIG. 6 will be described in detail.

First, when the portable wireless terminal 10A starts a communication, the W-LAN wireless unit 52 and the W-LAN signal processing unit 53 are turned on. Next, in the W-LAN system shown in FIG. 6, the portable wireless terminal 10A searches an access point located at a closest position, e.g., the first access point 101 and communicates with the first access point 101. Through the communication, the CPU 41 of the portable wireless terminal 10A acquires the characteristic information of the access point 101 and inquires of the position information server 110 about the position of the access point 101 using the acquired characteristic information.

The position information server 110 notifies the portable wireless terminal 10A of the position information indicating the location of the access point 101. The CPU 41 stores the notified position information in storage means (not shown) as the initial position at which the portable wireless terminal 10A is located currently.

In the previous description, when starting a communication, the portable wireless terminal 10A inquires about the position of the access point closest to the portable wireless terminal 10A in the W-LAN system shown in FIG. 6. Alternatively, before starting the communication, the portable wireless terminal 10A may acquire the position of the closest access point in advance. In this case, at the start of the communication, the already acquired position information can be used as the initial position at which the portable wireless terminal 10A is currently located instead of performing the operation for acquiring the position information on the closest access point.

Furthermore, not in the W-LAN system but in the other wireless system such as an RFID (Radio Frequency Identification) tag system or a wireless IC card system, the portable wireless terminal 10A may be caused to operate at designated time so as to be able to receive wireless signals. As long as the portable wireless terminal 10A can acquire the position information on the access point closest to the portable wireless terminal 10A, the system can operate identically with the W-LAN system.

For example, if an automatic ticket gate using wireless IC cards is disposed at a ticket wicket in a station, the portable wireless terminal 10A is allowed to operate similarly using the wireless IC cards. In this case, when a user passes through the ticket wicket using his or her wireless IC card, the portable wireless terminal 10A can recognize a current position of the wireless IC card as the initial position of the portable wireless terminal 10A.

(Fourth Embodiment)

A fourth embodiment of the present invention will be described. The fourth embodiment is identical with the first, second, and third embodiments except for a unit detecting an initial position. Therefore, only the unit detecting an initial position will be described.

The fourth embodiment is suited for an instance in which a portable wireless terminal cannot use a wireless system such as the GPS or the W-LAN system or includes the wireless system but is present outside the zone of the wireless system.

In the fourth embodiment, if the position of the portable wireless terminal is to be identified, a user of the portable wireless terminal inputs position information. The user inputs information on a name of the position, e.g., "place of work", "user's home", "school", "shop" or "station", an address, and a telephone number as well as the other information for identifying the position or uses means for selecting a location from a list of locations registered in advance, thereby designating the location where the user is currently present.

A CPU of the portable wireless terminal, e.g., the CPU 41 of the portable wireless terminal 10 shown in FIG. 2 transmits the location information input at the time of starting a communication to the position information server using the transmitting unit 29 and the antenna 20 via a data communication line and inquires of the position information server about the position at which the portable wireless terminal 10 is currently present. The position information server stores therein information indicating correspondence between the location information input by the user and the position information. The position information server notifies the portable wireless terminal 10 that transmits the inquiry of the position information on the position at which the portable wireless terminal 10 is currently present. The CPU 41 of the portable wireless terminal 10 obtains the position information notified by the position information server and stores the position information in storage means (not shown) as the initial position at which the portable wireless terminal 10 is currently present.

Alternatively, the correspondence between the location information input by the user and the position information may be stored in the storage means (not shown) of the portable wireless terminal 10 instead of using the position information server. In this case, the CPU 41 of the portable wireless terminal 10 may obtain the position information stored in the storage means from the location information input at the time of starting the communication and store the position information in the storage means (not shown) as the initial position at which the portable wireless terminal 10 is currently present.

In the fourth embodiment, if the user already inputs his or her position on the other arbitrary application installed in the portable wireless terminal, the position information can be used to detect the velocity and there is no need to bother to input the location where the user is currently present to detect the velocity of the portable wireless terminal.

The constitutions of the preferred embodiments of the present invention have been described so far. It is to be noted, however, that these embodiments are given only for illustrative purposes of the present invention. Persons having ordinary skill in the art could readily understand that various changes and modifications can be made according to specific purposes without departure of the concept of the present invention.

The invention claimed is:

1. A portable wireless terminal comprising:
   an initial position calculator configured to calculate initial position information indicating an initial position of the portable wireless terminal at start of a communication based on a Global Positioning System (GPS) down signal;
   a moving velocity vector obtaining unit configured to obtain a current moving velocity vector of the portable wireless terminal based on base station position information indicating installation positions of a plurality of base stations, respectively, the initial position information, and information on relative velocities of the portable wireless terminal to the respective base stations by applying relative position vectors which are defined by the initial position information and the base station position information to the information on relative velocities in order to determine relative velocity vectors, and by synthesizing the relative velocity vectors.

2. The portable wireless terminal according to claim 1, further comprising a current position calculating unit configured to calculate current position information on the portable wireless terminal from the current moving velocity vector of the portable wireless terminal and the initial position information,
   wherein the moving velocity vector obtaining unit obtains the current moving velocity vector of the portable wireless terminal the base station information, the information on the relative velocities, and the calculated current position information in place of the initial position information, and
   the current position calculating unit newly calculates thereafter new current position information whenever the current moving velocity vector is obtained by the moving velocity vector obtaining unit, and replaces the current position information with the new current position information for the moving velocity vector obtaining unit to use the new current position information to calculate the moving velocity vector next time during the communication of the portable wireless terminal.

3. The portable wireless terminal according to claim 2, wherein,
   if the current position information is to be replaced with the new current position information whenever the current moving velocity vector is obtained and the new current position information is to be used to calculate the moving velocity vector the next time, the current position calculating unit recalculates the current position information of the portable wireless terminal as the initial position information whenever predetermined time passes, whenever a moving distance from the initial position reaches a predetermined threshold value or at a predetermined frequency according to the calculated moving velocity vector or required calculation accuracy similarly to the start of the communication, and
   the moving velocity vector obtaining unit calculates the current moving velocity vector of the portable wireless terminal based on the recalculated initial position information in place of the new current position information, the base station information, and the information on the relative velocities during the communication of the portable wireless terminal.

4. The portable wireless terminal according to claim 1, further comprising:
   a receiving unit comprising a demodulator, the demodulator configured to obtain information of down signals from the respective base stations;
   a Doppler effect calculator configured to calculate Doppler effects of the down signals from the respective base stations using the information obtained by the demodulator; and
   a relative velocity obtaining unit configured to obtain the information on the relative velocities of the portable wireless terminal to the respective base stations based on the Doppler effects.

5. The portable wireless terminal according to claim 1, further comprising:
   a receiving unit comprising a demodulator, the demodulator configured to obtain information on a phase rotation velocity of a phase modulation symbol point; and
   a relative velocity obtaining unit configured to obtain the information on the relative velocities of the portable wireless terminal to the respective base stations based on the information on the phase rotation velocity.

6. The portable wireless terminal according to claim 1, further comprising:
   a Code Division Multiple Access (CDMA) receiving unit configured to demodulate down signals from the respective base stations; and
   a relative velocity obtaining unit configured to calculate the information on the relative velocities of the portable wireless terminal to the respective base stations from state changes of delay profiles of the down signals.

7. The portable wireless terminal according to claim 1, further comprising:
a wireless unit responsible for the communication; and
a parameter changer configured to change a parameter set to the wireless unit based on the information indicating a current state of the portable wireless terminal obtained by the moving velocity vector obtaining unit.

8. The portable wireless terminal according to claim 1, further comprising a base station position obtaining unit configured to obtain the base station position information indicating the installation positions of the respective base stations using base station characteristic information capable of uniquely identifying the respective base stations.

9. The portable wireless terminal according to claim 1, further comprising a transmitter configured to transmit an inquiry signal to the base stations currently communicating with the portable wireless terminal for obtaining the base station position information indicating the installation positions of the respective base stations.

10. The portable wireless terminal according to claim 1, further comprising a controlling unit configured to control the initial position calculator to operate when receiving a GPS signal for obtaining the initial position information on the portable wireless terminal.

11. The portable wireless terminal according to claim 1, further comprising a controlling unit configured to control the initial position calculator to operate when receiving position information on an access point from a wireless Local Area Network (LAN) system for obtaining the initial position information on the portable wireless terminal.

12. The portable wireless terminal according to claim 1, further comprising a controller configured to control the initial position calculator to operate when receiving a wireless signal from an Radio Frequency Identification (RFID) system or a wireless Integrated Circuit (IC) card for obtaining the initial position information on the portable wireless terminal.

13. The portable wireless terminal according to claim 1, wherein the initial position calculator utilizes information input by a user of the portable wireless terminal as the initial position information on the portable wireless terminal.

14. A method of detecting a moving velocity vector of a portable wireless terminal, comprising obtaining a current moving velocity vector of the portable wireless terminal based on base station position information indicating installation positions of a plurality of base stations, respectively, initial position information indicating an initial position of the portable wireless terminal at start of a communication, and information on relative velocities of the portable wireless terminal to the respective base stations by applying relative position vectors which are defined by the initial position information and base station position information of a plurality of base stations, to the information on relative velocities in order to determine relative velocity vectors, and by synthesizing the relative velocity vectors.

15. The method of detecting a moving velocity vector of a portable wireless terminal according to claim 14, further comprising calculating current position information on the portable wireless terminal from the current moving velocity vector of the portable wireless terminal and the initial position information, obtaining the current moving velocity vector of the portable wireless terminal based on the base station information, the information on the relative velocities, and the calculated current position information in place of the initial position information, and newly calculating thereafter a current position whenever the current moving velocity vector is obtained, and for updating previous current position information to new current position information to use the updated current position information to calculate the moving velocity vector next time during the communication of the portable wireless terminal.

16. The method of detecting a moving velocity vector of a portable wireless terminal according to claim 15, further comprising, if the previous current position information is to be updated to the new current position information whenever the current moving velocity vector is obtained and the updated current position information is to be used to calculate the moving velocity vector the next time, recalculating the current position of the portable wireless terminal as the initial position information whenever predetermined time passes, whenever a moving distance from the initial position reaches a predetermined threshold value or at a predetermined frequency according to the calculated moving velocity vector or required calculation accuracy similarly to the start of the communication, and calculating the current moving velocity vector of the portable wireless terminal based on the recalculated initial position information in place of the updated current position information, the base station information, and the information on the relative velocities during the communication of the portable wireless terminal.

17. The method of detecting a moving velocity vector of a portable wireless terminal according to claim 14, further comprising calculating Doppler effects of down signals from the respective base stations using information obtained by a demodulator of a receiving unit included in the portable wireless terminal, and obtaining the information on the relative velocities of the portable wireless terminal to the respective base stations based on the Doppler effect.

18. The method of detecting a moving velocity vector of a portable wireless terminal according to claim 14, further comprising obtaining the information on the relative velocities of the portable wireless terminal to the respective base stations using information on a phase rotation velocity of a phase modulation symbol point obtained by a demodulator of a receiving unit included in the portable wireless terminal and obtaining the information on the relative velocities of the portable wireless terminal to the respective base stations based on the information on the phase rotation velocity.

19. The method of detecting a moving velocity vector of a portable wireless terminal according to claim 14, further comprising causing a Code Division Multiple Access (CDMA) receiving unit included in the portable wireless terminal to demodulate down signals from the respective base stations, and calculating the information on the relative velocities of the portable wireless terminal to the respective base stations from state changes of delay profiles of the down signals.

20. The method of detecting a moving velocity vector of a portable wireless terminal according to claim 14, further comprising changing a parameter set to a wireless unit responsible for the communication based on the information indicating a current state of the portable wireless terminal obtained.

21. The method of detecting a moving velocity vector of a portable wireless terminal according to claim 14, further comprising obtaining position information indicating the installation positions of the respective base stations by using base station characteristic information capable of uniquely identifying the respective base stations or by transmitting an inquiry signal to the base stations currently communicating with the portable wireless terminal so as to obtain the position information indicating the installation positions of the respective base stations.

22. The method of detecting a moving velocity vector of a portable wireless terminal according to claim 14, further comprising obtaining the initial position information by causing to operate at a designated time as a time for obtaining the initial position for receiving a Global Positioning System (GPS) signal to either receive position information on an access point from a wireless Local Area Network (LAN) system or receive a wireless signal from an Radio Frequency Identification (RFID) system or a wireless Integrated Circuit (IC) card and/or by using information input by a user of the portable wireless terminal so as to obtain the initial position information on the portable wireless terminal.

* * * * *

UNITED STATES PATENT AND TRADEMARK OFFICE
CERTIFICATE OF CORRECTION

PATENT NO. : 8,326,316 B2  Page 1 of 21
APPLICATION NO. : 11/910169
DATED : December 4, 2012
INVENTOR(S) : Ogoro It is certified that error appears in the above-identified patent and that said Letters Patent is hereby corrected as shown below:

In the specification

Columns 5-8, Line 51-52, delete "(1) A portable wireless terminal comprising means for obtaining a current moving velocity of the portable wireless terminal from base station position information indicating installation positions of a plurality of base stations, respectively, from initial position information indicating an initial position of the portable wireless terminal at start of a communication, and from information on relative velocities of the portable wireless terminal to the respective base stations.

(2) The portable wireless terminal according to (1) above, comprising means for calculating current position information on the portable wireless terminal from the current moving velocity of the portable wireless terminal and the initial position information, for obtaining the current moving velocity of the portable wireless terminal from the base station information, from the information on the relative velocities, and from the calculated current position information in place of the initial position information, for newly calculating thereafter a current position whenever the current moving velocity is obtained, and for updating previous current position information to new current position information to use the updated current position information to calculate the moving velocity next time during the communication of the portable wireless terminal.

(3) The portable wireless terminal according to (2) above, comprising means for, if the previous current position information is to be updated to the new current position information whenever the current moving velocity is obtained and the updated current position information is to be used to calculate the moving velocity the next time, recalculating the current position of the portable wireless terminal as the initial position information whenever predetermined time passes, whenever a moving Signed and Sealed this
Seventeenth Day of May, 2016

Michelle K. Lee
*Director of the United States Patent and Trademark Office* distance from the initial position reaches a predetermined threshold value or at a predetermined frequency according to the calculated moving velocity or required calculation accuracy similarly to the start of the communication, and for calculating the current moving velocity of the portable wireless terminal from the recalculated initial position information in place of the updated current position information, from the base station information, and from the information on the relative velocities during the communication of the portable wireless terminal.

(4) The portable wireless terminal according to any one of (1) to (3), comprising means for calculating Doppler effects of down signals from the respective base stations using information obtained by a demodulator of a receiving unit included in the portable wireless terminal, and for obtaining the information on the relative velocities of the portable wireless terminal to the respective base stations as means for obtaining the information on the relative velocities of the portable wireless terminal to the respective base stations.

(5) The portable wireless terminal according to any one of (1) to (3), comprising means for using information on a phase rotation velocity of a phase modulation symbol point obtained by a demodulator of a receiving unit included in the portable wireless terminal as means for obtaining the information on the relative velocities of the portable wireless terminal to the respective base stations.

(6) The portable wireless terminal according to any one of (1) to (3), comprising means for causing a CDMA receiving unit included in the portable wireless terminal to demodulate down signals from the respective base stations, and for calculating the information on the relative velocities of the portable wireless terminal to the respective base stations from state changes of delay profiles of the down signals as means for obtaining the information on the relative velocities of the portable wireless terminal to the respective base stations.

(7) The portable wireless terminal according to any one of (1) to (6), comprising means for changing a parameter set to a wireless unit responsible for the communication based on the information indicating a current state of the portable wireless terminal obtained by the means for obtaining the current moving velocity of the portable wireless terminal.

(8) The portable wireless terminal according to any one of (1) to (7), comprising means for using base station characteristic information capable of uniquely identifying the respective base stations as means for obtaining the base station position information indicating the installation positions of the respective base stations.

(9) The portable wireless terminal according to any one of (1) to (7), comprising means for transmitting an inquiry signal to the base stations currently communicating with the portable wireless terminal as means for obtaining the base station position information indicating the installation positions of the respective base stations.

(10) The portable wireless terminal according to any one of (1) to (9), comprising means operating at a designated time as a time for obtaining the initial position, for receiving a GPS (Global Positioning System) signal as means for obtaining the initial position information on the portable wireless terminal.

(11) The portable wireless terminal according to any one of (1) to (9), comprising means operating at a designated time as a time for obtaining the initial position, for receiving position information on an access point from a wireless LAN system as means for obtaining the initial position information on the portable wireless terminal.

(12) The portable wireless terminal according to any one of (1) to (9), comprising means operating at a designated time as a time for obtaining the initial position, for receiving a wireless signal from an RFID (Radio Frequency Identification) system or a wireless IC card as means for obtaining the initial position information on the portable wireless terminal.

(13) The portable wireless terminal according to any one of (1) to (12), comprising means for using information input by a user of the portable wireless terminal as means for obtaining the initial position information on the portable wireless terminal.

(14) A method of detecting a moving velocity of a portable wireless terminal, comprising obtaining a current moving velocity of the portable wireless terminal from base station position information indicating installation positions of a plurality of base stations, respectively, from initial position information indicating an initial position of the portable wireless terminal at start of a communication, and from information on relative velocities of the portable wireless terminal to the respective base stations.

(15) The method of detecting a moving velocity of a portable wireless terminal according to (14), comprising means for calculating current position information on the portable wireless terminal from the current moving velocity of the portable wireless terminal and the initial position information, for obtaining the current moving velocity of the portable wireless terminal from the base station information, from the information on the relative velocities, and from the calculated current position information in place of the initial position information, for newly calculating thereafter a current position whenever the current moving velocity is obtained, and for updating previous current position information to new current position information to use the updated current position information to calculate the moving velocity next time during the communication of the portable wireless terminal.

(16) The method of detecting a moving velocity of a portable wireless terminal according to (15), comprising, if the previous current position information is to be updated to the new current position information whenever the current moving velocity is obtained and the updated current position information is to be used to calculate the moving velocity the next time, recalculating the current position of the portable wireless terminal as the initial position information whenever predetermined time passes, whenever a moving distance from the initial position reaches a predetermined threshold value or at a predetermined frequency according to the calculated moving velocity or required calculation accuracy similarly to the start of the communication, and calculating the current moving velocity of the portable wireless terminal from the recalculated initial position information in place of the updated current position information, from the base station information, and from the information on the relative velocities during the communication of the portable wireless terminal.

(17) The method of detecting a moving velocity of a portable wireless terminal according to any one of (14) to (16), comprising calculating Doppler effects of down signals from the respective base stations using information obtained by a demodulator of a receiving unit included in the portable wireless terminal, and obtaining the information on the relative velocities of the portable wireless terminal to the respective base stations as means for obtaining the information on the relative velocities of the portable wireless terminal to the respective base stations.

(18) The method of detecting a moving velocity of a portable wireless terminal according to any one of (14) to (16), comprising obtaining the information on the relative velocities of the portable wireless terminal to the respective base stations using information on a phase rotation velocity of a phase modulation symbol point obtained by a demodulator of a receiving unit included in the portable wireless terminal.

(19) The method of detecting a moving velocity of a portable wireless terminal according to any one of (14) to (16), comprising causing a CDMA receiving unit included in the portable wireless terminal to demodulate down signals from the respective base stations, and calculating the information on the relative velocities of the portable wireless terminal to the respective base stations from state changes of delay profiles of the down signals.

(20) The method of detecting a moving velocity of a portable wireless terminal according to any one of (14) to (19), comprising changing a parameter set to a wireless unit responsible for the communication based on the information indicating a current state of the portable wireless terminal obtained.

(21) The method of detecting a moving velocity of a portable wireless terminal according to any one of (14) to (20), comprising obtaining position information indicating the installation positions of the respective base stations by using base station characteristic information capable of uniquely identifying the respective base stations or by transmitting an inquiry signal to the base stations currently communicating with the portable wireless terminal so as to obtain the position information indicating the installation positions of the respective base stations.

(22) The method of detecting a moving velocity of a portable wireless terminal according to any one of (14) to (21), comprising obtaining the initial position information by causing to operate at a designated time as a time for obtaining the initial position for receiving a GPS (Global Positioning System) signal to either receive position information on an access point from a wireless LAN system or receive a wireless signal from an RFID (Radio Frequency Identification) system or a wireless IC card and/or by using information input by a user of the portable wireless terminal so as to obtain the initial position information on the portable wireless terminal." and Column 10 line 14-23, insert,
-- Example 1
A portable wireless terminal including means for obtaining a current moving velocity of the portable wireless terminal from base station position information indicating installation positions of a plurality of base stations, respectively, from initial position information indicating an initial position of the portable wireless terminal at start of a communication, and from information on relative velocities of the portable wireless terminal to the respective base stations. --

Column 10 line 25-41, insert,
-- Example 2

The portable wireless terminal according to Example 1 above, including means for calculating current position information on the portable wireless terminal from the current moving velocity of the portable wireless terminal and the initial position information, for obtaining the current moving velocity of the portable wireless terminal from the base station information, from the information on the relative velocities, and from the calculated current position information in place of the initial position information, for newly calculating thereafter a current position whenever the current moving velocity is obtained, and for updating previous current position information to new current position information to use the updated current position information to calculate the moving velocity next time during the communication of the portable wireless terminal. --

Column 10 line 43-62, insert,

-- Example 3

The portable wireless terminal according to Example 2 above, including means for, if the previous current position information is to be updated to the new current position information whenever the current moving velocity is obtained and the updated current position information is to be used to calculate the moving velocity the next time, recalculating the current position of the portable wireless terminal as the initial position information whenever predetermined time passes, whenever a moving distance from the initial position reaches a predetermined threshold value or at a predetermined frequency according to the calculated moving velocity or required calculation accuracy similarly to the start of the communication, and for calculating the current moving velocity of the portable wireless terminal from the recalculated initial position information in place of the updated current position information, from the base station information, and from the information on the relative velocities during the communication of the portable wireless terminal. --

Column 10 & 11 line 64-7, insert,

-- Example 4

The portable wireless terminal according to any one of Examples 1 to 3, including means for calculating Doppler effects of down signals from the respective base stations using information obtained by a demodulator of a receiving unit included in the portable wireless terminal, and for obtaining the information on the relative velocities of the portable wireless terminal to the respective base stations as means for obtaining the information on the relative velocities of the portable wireless terminal to the respective base stations. --

Column 11 line 9-17, insert,

-- Example 5

The portable wireless terminal according to any one of Examples 1 to 3, including means for using information on a phase rotation velocity of a phase modulation symbol point obtained by a demodulator of a receiving unit included in the portable wireless terminal as means for obtaining the information on the relative velocities of the portable wireless terminal to the respective base stations. --

Column 11 line 19-31, insert,

-- Example 6

The portable wireless terminal according to any one of Examples 1 to 3, including means for causing a CDMA receiving unit included in the portable wireless terminal to demodulate down signals from the respective base stations, and for calculating the information on the relative velocities of the portable wireless terminal to the respective base stations from state changes of delay profiles of the down signals as means for obtaining the information on the relative velocities of the portable wireless terminal to the respective base stations. --

Column 11 line 33-41, insert,

-- Example 7

The portable wireless terminal according to any one of Examples 1 to 6, including means for changing a parameter set to a wireless unit responsible for the communication based on the information indicating a current state of the portable wireless terminal obtained by the means for obtaining the current moving velocity of the portable wireless terminal. --

Column 11 line 42-49 insert,

-- Example 8

The portable wireless terminal according to any one of Examples 1 to 7, including means for using base station characteristic information capable of uniquely identifying the respective base stations as means for obtaining the base station position information indicating the installation positions of the respective base stations. --

Column 11 line 51-58, insert,

-- Example 9

The portable wireless terminal according to any one of Examples 1 to 7, including means for transmitting an inquiry signal to the base stations currently communicating with the portable wireless terminal as means for obtaining the base station position information indicating the installation positions of the respective base stations. --

Column 11 line 60-67, insert,

-- Example 10

The portable wireless terminal according to any one of Examples 1 to 9, including means operating at a designated time as a time for obtaining the initial position, for receiving a GPS (Global Positioning System) signal as means for obtaining the initial position information on the portable wireless terminal. --

Column 12 line 3-9, insert,

-- Example 11

The portable wireless terminal according to any one of Examples 1 to 9, including means operating at a designated time as a time for obtaining the initial position, for receiving position information on an access point from a wireless LAN system as means for obtaining the initial position information on the portable wireless terminal. --

Column 12 line 10-19, insert,

-- Example 12

The portable wireless terminal according to any one of Examples 1 to 9, including means operating at a designated time as a time for obtaining the initial position, for receiving a wireless signal from an RFID (Radio Frequency Identification) system or a wireless IC card as means for obtaining the initial position information on the portable wireless terminal. --

Column 12 line 20-26, insert,

-- Example 13

The portable wireless terminal according to any one of Examples 1 to 12, including means for using information input by a user of the portable wireless terminal as means for obtaining the initial position information on the portable wireless terminal. --

Column 12 line 28-39, insert,

-- Example 14

A method of detecting a moving velocity of a portable wireless terminal, including obtaining a current moving velocity of the portable wireless terminal from base station position information indicating installation positions of a plurality of base stations, respectively, from initial position information indicating an initial position of the portable wireless terminal at start of a communication, and from information on relative velocities of the portable wireless terminal to the respective base stations. --

Column 12 line 40-56, insert,

-- Example 15

The method of detecting a moving velocity of a portable wireless terminal according to Example 1 4, including means for calculating current position information on the portable wireless terminal from the current moving velocity of the portable wireless terminal and the initial position information, for obtaining the current moving velocity of the portable wireless terminal from the base station information, from the information on the relative velocities, and from the calculated current position information in place of the initial position information, for newly calculating thereafter a current position whenever the current moving velocity is obtained, and for updating previous current position information to new current position information to use the updated current position information to calculate the moving velocity next time during the communication of the portable wireless terminal. --

Column 12-13 line 58-11, insert,

-- Example 16

The method of detecting a moving velocity of a portable wireless terminal according to Example 15, including, if the previous current position information is to be updated to the new current position information whenever the current moving velocity is obtained and the updated current position information is to be used to calculate the moving velocity the next time, recalculating the current position of the portable wireless terminal as the initial position information whenever predetermined time passes, whenever a moving distance from the initial position reaches a predetermined threshold value or at a predetermined frequency according to the calculated moving velocity or required calculation accuracy similarly to the start of the communication, and calculating the current moving velocity of the portable wireless terminal from the recalculated initial position information in place of the updated current position information, from the base station information, and from the information on the relative velocities during the communication of the portable wireless terminal. --

Column 13 line 13-24, insert,

-- Example 17

The method of detecting a moving velocity of a portable wireless terminal according to any one of Examples 14 to 16, including calculating Doppler effects of down signals from the respective base stations using information obtained by a demodulator of a receiving unit included in the portable wireless terminal, and obtaining the information on the relative velocities of the portable wireless terminal to the respective base stations as means for obtaining the information on the relative velocities of the portable wireless terminal to the respective base stations. --

Column 13 line 28-34, insert,

-- Example 18

The method of detecting a moving velocity of a portable wireless terminal according to any one of Examples 14 to 16, including obtaining the information on the relative velocities of the portable wireless terminal to the respective base stations using information on a phase rotation velocity of a phase modulation symbol point obtained by a demodulator of a receiving unit included in the portable wireless terminal. --

Column 13 line 36-45, insert,

-- Example 19

The method of detecting a moving velocity of a portable wireless terminal according to any one of Examples 14 to 16, including causing a CDMA receiving unit included in the portable wireless terminal to demodulate down signals from the respective base stations, and calculating the information on the relative velocities of the portable wireless terminal to the respective base stations from state changes of delay profiles of the down signals. --

Column 13 line 47-53, insert,

-- Example 20

The method of detecting a moving velocity of a portable wireless terminal according to any one of Examples 14 to 19, including changing a parameter set to a wireless unit responsible for the communication based on the information indicating a current state of the portable wireless terminal obtained. --

Column 13 line 56-67, insert,

-- Example 21

The method of detecting a moving velocity of a portable wireless terminal according to any one of Examples 14 to 20, including obtaining position information indicating the installation positions of the respective base stations by using base station characteristic information capable of uniquely identifying the respective base stations or by transmitting an inquiry signal to the base stations currently communicating with the portable wireless terminal so as to obtain the position information indicating the installation positions of the respective base stations. --

Column 14 line 1-25, insert,

-- Example 22

The method of detecting a moving velocity of a portable wireless terminal according to any one of Examples 14 to 21, including obtaining the initial position information by causing to operate at a designated time as a time for obtaining the initial position for receiving a GPS (Global Positioning System) signal to either receive position information on an access point from a wireless LAN system or receive a wireless signal from an RFID (Radio Frequency Identification) system or a wireless IC card and/or by using information input by a user of the portable wireless terminal so as to obtain the initial position information on the portable wireless terminal. --

Columns 10-14, Line 14: delete

"Example 1

A portable wireless terminal including means for obtaining a current moving velocity of the portable wireless terminal from base station position information indicating installation positions of a plurality of base stations, respectively, from initial position information indicating an initial position of the portable wireless terminal at start of a communication, and from information on relative velocities of the portable wireless terminal to the respective base stations.

Example 2

The portable wireless terminal according to Example 1 above, including means for calculating current position information on the portable wireless terminal from the current moving velocity of the portable wireless terminal and the initial position information, for obtaining the current moving velocity of the portable wireless terminal from the base station information, from the information on the relative velocities, and from the calculated current position information in place of the initial position information, for newly calculating thereafter a current position whenever the current moving velocity is obtained, and for updating previous current position information to new current position information to use the updated current position information to calculate the moving velocity next time during the communication of the portable wireless terminal.

Example 3

The portable wireless terminal according to Example 2 above, including means for, if the previous current position information is to be updated to the new current position information whenever the current moving velocity is obtained and the updated current position information is to be used to calculate the moving velocity the next time, recalculating the current position of the portable wireless terminal as the initial position information whenever predetermined time passes, whenever a moving distance from the initial position reaches a predetermined threshold value or at a predetermined frequency according to the calculated moving velocity or required calculation accuracy similarly to the start of the communication, and for calculating the current moving velocity of the portable wireless terminal from the recalculated initial position information in place of the updated current position information, from the base station information, and from the information on the relative velocities during the communication of the portable wireless terminal.

Example 4

The portable wireless terminal according to any one of Examples 1 to 3, including means for calculating Doppler effects of down signals from the respective base stations using information obtained by a demodulator of a receiving unit included in the portable wireless terminal, and for obtaining the information on the relative velocities of the portable wireless terminal to the respective base stations as means for obtaining the information on the relative velocities of the portable wireless terminal to the respective base stations.

Example 5

The portable wireless terminal according to any one of Examples 1 to 3, including means for using information on a phase rotation velocity of a phase modulation symbol point obtained by a demodulator of a receiving unit included in the portable wireless terminal as means for obtaining the information on the relative velocities of the portable wireless terminal to the respective base stations.

Example 6

The portable wireless terminal according to any one of Examples 1 to 3, including means for causing a CDMA receiving unit included in the portable wireless terminal to demodulate down signals from the respective base stations, and for calculating the information on the relative velocities of the portable wireless terminal to the respective base stations from state changes of delay profiles of the down signals as means for obtaining the information on the relative velocities of the portable wireless terminal to the respective base stations.

Example 7

The portable wireless terminal according to any one of Examples 1 to 6, including means for changing a parameter set to a wireless unit responsible for the communication based on the information indicating a current state of the portable wireless terminal obtained by the means for obtaining the current moving velocity of the portable wireless terminal.

Example 8

The portable wireless terminal according to any one of Examples 1 to 7, including means for using base station characteristic information capable of uniquely identifying the respective base stations as means for obtaining the base station position information indicating the installation positions of the respective base stations.

Example 9

The portable wireless terminal according to any one of Examples 1 to 7, including means for transmitting an inquiry signal to the base stations currently communicating with the portable wireless terminal as means for obtaining the base station position information indicating the installation positions of the respective base stations.

Example 10

The portable wireless terminal according to any one of Examples 1 to 9, including means operating at a designated time as a time for obtaining the initial position, for receiving a GPS (Global Positioning System) signal as means for obtaining the initial position information on the portable wireless terminal.

Example 11

The portable wireless terminal according to any one of Examples 1 to 9, including means operating at a designated time as a time for obtaining the initial position, for receiving position information on an access point from a wireless LAN system as means for obtaining the initial position information on the portable wireless terminal.

Example 12

The portable wireless terminal according to any one of Examples 1 to 9, comprising including means operating at a designated time as a time for obtaining the initial position, for receiving a wireless signal from an RFID (Radio Frequency Identification) system or a wireless IC card as means for obtaining the initial position information on the portable wireless terminal.

Example 13

The portable wireless terminal according to any one of Examples 1 to 12, including means for using information input by a user of the portable wireless terminal as means for obtaining the initial position information on the portable wireless terminal.

Example 14

A method of detecting a moving velocity of a portable wireless terminal, including obtaining a current moving velocity of the portable wireless terminal from base station position information indicating installation positions of a plurality of base stations, respectively, from initial position information indicating an initial position of the portable wireless terminal at start of a communication, and from information on relative velocities of the portable wireless terminal to the respective base stations.

Example 15

The method of detecting a moving velocity of a portable wireless terminal according to Example 14, including means for calculating current position information on the portable wireless terminal from the current moving velocity of the portable wireless terminal and the initial position information, for obtaining the current moving velocity of the portable wireless terminal from the base station information, from the information on the relative velocities, and from the calculated current position information in place of the initial position information, for newly calculating thereafter a current position whenever the current moving velocity is obtained, and for updating previous current position information to new current position information to use the updated current position information to calculate the moving velocity next time during the communication of the portable wireless terminal.

Example 16

The method of detecting a moving velocity of a portable wireless terminal according to Example 15, including, if the previous current position information is to be updated to the new current position information whenever the current moving velocity is obtained and the updated current position information is to be used to calculate the moving velocity the next time, recalculating the current position of the portable wireless terminal as the initial position information whenever predetermined time passes, whenever a moving distance from the initial position reaches a predetermined threshold value or at a predetermined frequency according to the calculated moving velocity or required calculation accuracy similarly to the start of the communication, and calculating the current moving velocity of the portable wireless terminal from the recalculated initial position information in place of the updated current position information, from the base station information, and from the information on the relative velocities during the communication of the portable wireless terminal.

Example 17

The method of detecting a moving velocity of a portable wireless terminal according to any one of Examples 14 to 16, including calculating Doppler effects of down signals from the respective base stations using information obtained by a demodulator of a receiving unit included in the portable wireless terminal, and obtaining the information on the relative velocities of the portable wireless terminal to the respective base stations as means for obtaining the information on the relative velocities of the portable wireless terminal to the respective base stations.

Example 18

The method of detecting a moving velocity of a portable wireless terminal according to any one of Examples 14 to 16, including obtaining the information on the relative velocities of the portable wireless terminal to the respective base stations using information on a phase rotation velocity of a phase modulation symbol point obtained by a demodulator of a receiving unit included in the portable wireless terminal.

Example 19

The method of detecting a moving velocity of a portable wireless terminal according to any one of Examples 14 to 16, including causing a CDMA receiving unit included in the portable wireless terminal to demodulate down signals from the respective base stations, and calculating the information on the relative velocities of the portable wireless terminal to the respective base stations from state changes of delay profiles of the down signals.

Example 20

The method of detecting a moving velocity of a portable wireless terminal according to any one of Examples 14 to 19, including changing a parameter set to a wireless unit responsible for the communication based on the information indicating a current state of the portable wireless terminal obtained.

Example 21

The method of detecting a moving velocity of a portable wireless terminal according to any one of Examples 14 to 20, including obtaining position information indicating the installation positions of the respective base stations by using base station characteristic information capable of uniquely identifying the respective base stations or by transmitting an inquiry signal to the base stations currently communicating with the portable wireless terminal so as to obtain the position information indicating the installation positions of the respective base stations.

Example 22

The method of detecting a moving velocity of a portable wireless terminal according to any one of Examples 14 to 21, including obtaining the initial position information by causing to operate at a designated time as a time for obtaining the initial position for receiving a GPS (Global Positioning System) signal to either receive position information on an access point from a wireless LAN system or receive a wireless signal from an RFID (Radio Frequency Identification) system or a wireless IC card and/or by using information input by a user of the portable wireless terminal so as to obtain the initial position information on the portable wireless terminal." and Column 14 line 14, insert,
-- Preferred embodiments of a portable wireless terminal and a method of detecting a moving speed of the portable wireless terminal according to the present invention will be described hereinafter with reference to the accompanying drawings.

(First embodiment)

A first embodiment of the present invention will be described in detail with reference to Figs. 1, 2, 3, and 4. Fig. 1 is a pattern diagram typically showing the relationship between a portable wireless terminal according to the present invention and base stations while the portable wireless terminal is in an operating state. Fig. 1 shows a state in which a portable wireless terminal 10 is present in service zones of a first base station (BS1) 11 and a second base station (BS2) 12, respectively, and in which the portable wireless terminal 10 is moving in a direction of a planned movement locus 15 at an instantaneous velocity v(vx,vy).

Namely, in this embodiment, the portable wireless terminal 10 is assumed to be currently at a current position S(Sx, Sy) along the planned movement locus 15 and to be moving in the direction along the planned movement locus 15 at a velocity vector of v(vx,vy). An elevation angle 13 between a moving direction and the first base station 11 is a value θ1, and an elevation angle 14 between the moving direction and the second base station 12 is a value θ2. --

Column 17 line 27-59, insert,

-- (Description of configuration)

Fig. 2 is a block configuration diagram showing an example of an internal configuration of the portable wireless terminal according to the present invention. Fig. 2 shows an internal configuration of a W-CDMA portable wireless terminal by way of example. Although the internal configuration of an actual portable wireless terminal is more complicated, Fig. 2 illustrates only elements necessary to describe the present invention.

A down signal arriving at the portable wireless terminal 10 shown in Fig. 1 from each of the respective base stations 11 and 12 is input into the portable wireless terminal 10 from an antenna 20 shown in Fig. 2, allocated to a receiving unit 22 by a branching filter 21, demodulated to a baseband signal by the receiving unit 22, converted into a digital signal by an A/D converter 23, and input to a RAKE receiver (CDMA receiving unit) 24.

The RAKE receiver 24 is configured to include a first correlator 241 to a sixth correlator 246, a first weight adder 247, a second weight adder 248, and a control unit 249.

The received signal converted into the digital signal is input first to the first correlator 241 serving as a searcher, the first correlator 241 calculates a correlation between the digital signal and a predetermined spreading code and acquires a delay profile of the digital signal, and the control unit 249 reads information on the delay profile. A parameter according to the delay wave is set to the second to sixth correlators 242 to 246 serving as fingers by the control unit 249, the respective fingers 242 to 246 calculate and detect peak correlations of the delay waves allocated thereto, the first weight adder 247 or the second weight adder 248 adds a weight to the peak correlations and input despread outputs to a first secondary demodulator 251 or a second secondary demodulator 252, and the first secondary demodulator 251 or the second secondary demodulator 252 decodes the despread outputs to original digital data.

The delay profile acquired by the searcher is a direct reflection of multipaths received by the portable wireless terminal 10. Therefore, the delay profile fluctuates appropriately according to movement of the portable wireless terminal 10. Accordingly, during high-velocity movement, it is necessary to acquire the delay profile more frequently than during low-velocity movement. Further, if a new path is discovered and level becomes higher, it is required to exercise finer control such as early changeover to the new path.

In the embodiment, an instance in which the RAKE receiver 24 includes six correlators has been described. However, generality remains even if the number of correlations is other than six. To facilitate description of this embodiment, it is described that the number of correlators is six. No problems occur even if actual portable wireless terminals differ in the number of correlators. Some currently available portable wireless terminals each including a RAKE receiver including eight or more correlators are known.

The searcher and the fingers constituting the RAKE receiver 24 are obtained by allocating correlation detectors for a predetermined spreading code according to their purposes. Normally, such a setting can be made that one correlator serves as both a searcher and a finger.

Figure 3:
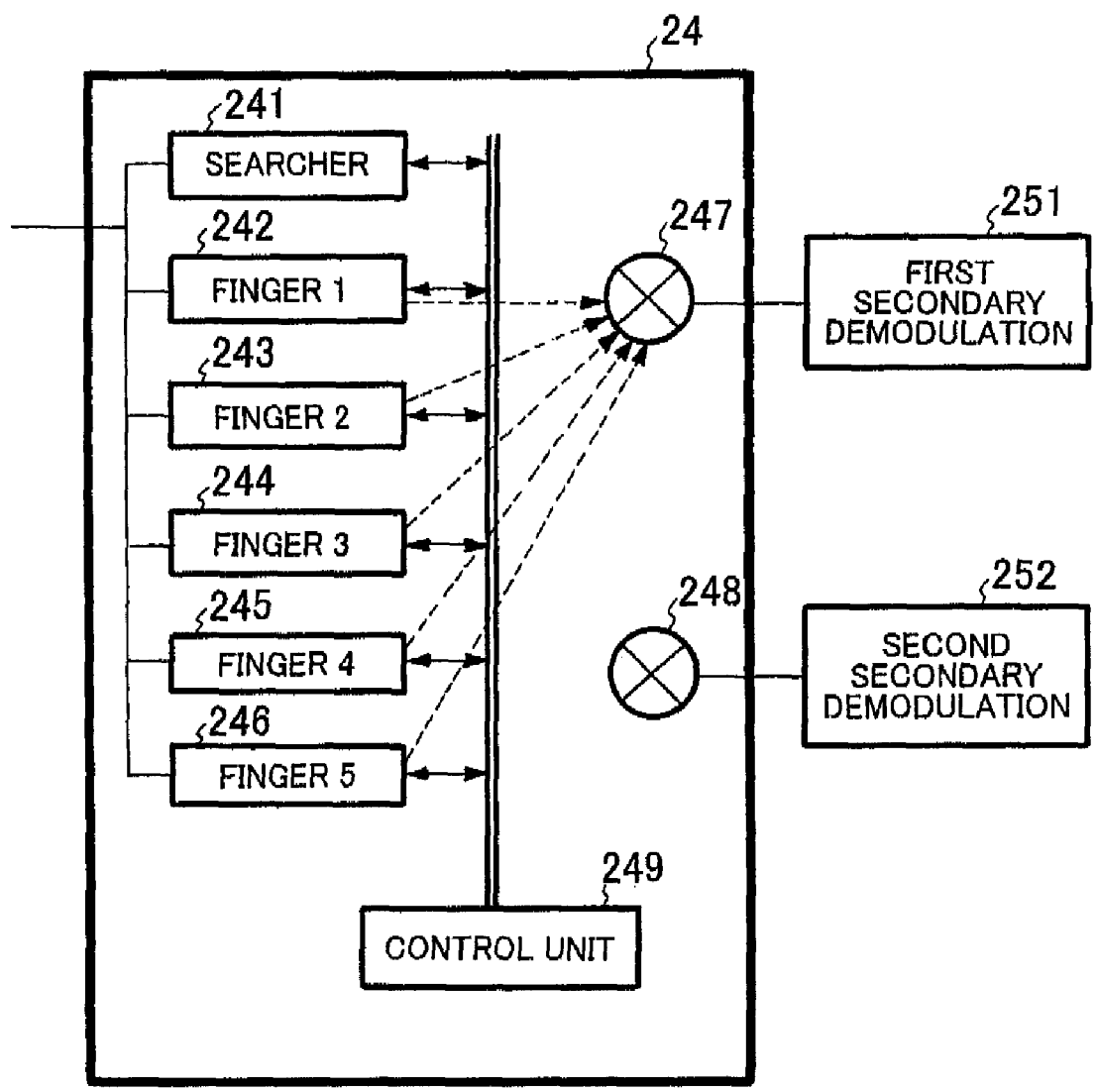
FIG. 3 is a block diagram of a RAKE receiver showing an example of assignment of correlators when the portable wireless station communicates only with one base station.

Fig. 3 is a block diagram of the RAKE receiver showing an example of assignment of the correlators when the portable wireless station 10 communicates with, for example, the first base station 11. In the example shown in Fig. 3, the first correlator 241 is allocated to a searcher and the five other correlators, i.e., the second correlator 242 to the sixth correlator 246 are allocated to fingers, respectively. Since the number of base stations is one, it suffices to use only one searcher and the remaining correlators can be all allocated to the fingers so as to contribute to improving receiving performance. Further, because of one base station, the number of demodulated data is also one, only the first weight adder 247 and the first secondary demodulator 251 operate, and the second weight adder 248 and the second secondary demodulator 252 do not operate.

CERTIFICATE OF CORRECTION (continued)
U.S. Pat. No. 8,326,316 B2

Figure 4:
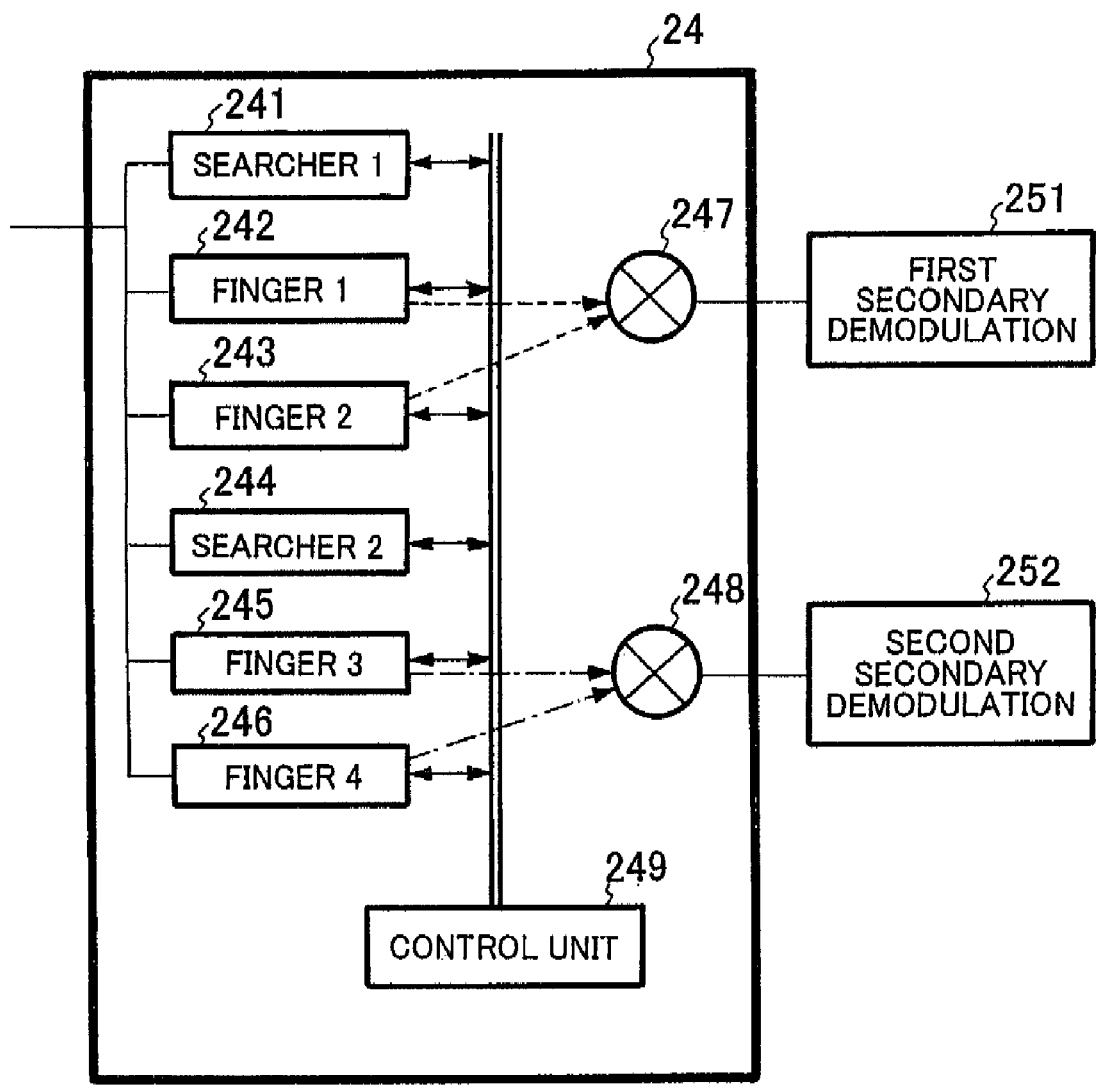
FIG. 4 is a block diagram of a RAKE receiver showing an example of assignment of correlators when the portable wireless station communicates with two base stations simultaneously.

On the other hand, Fig. 4 is a block diagram of the RAKE receiver showing an example of assignment of correlators when the portable wireless station 10 communicates with two base stations, e.g., the first base station 11 and the second base station 12 simultaneously. In the example shown in Fig. 4, the first correlator 241 and the fourth correlator 244 are assigned to searchers and the four other correlators are assigned to fingers, respectively. Because of presence of two base stations simultaneously communicated with the portable wireless terminal 10, it is necessary to despread the received signals using different spreading codes or at different spreading phases. Due to this, it is necessary to prepare two sets of the searcher, the finger, the weight adder, and the secondary demodulator.

Accordingly, as shown in Fig. 1, if the portable wireless terminal 10 receives signal waves from a plurality of base stations that is at least two or more base stations, e.g., the first base station 11 and the second base station 12 and performs a soft hand-over, it is necessary to despread the received signals using as many different spreading codes as the base stations. Due to this, as shown in Fig. 4, the six correlators are reconfigured to be classified into two groups corresponding to the respective spreading codes, i.e., the group including the searcher 1 241, the finger 1 242, and the finger 2 243 for receiving a down signal from the first base station, and the group including the searcher 2 244, the finger 3 245, and the finger 4 246 for receiving a down signal from the second base station 12. The reconfiguration can be easily realized by means such as the control unit 249, a CPU 41 or the like for rewriting settings of paths for the received signals and demodulator circuits using registers or the like that can store setting information, respectively.

A synchronous detector 25 estimates a symbol point from the signals subjected to the despreading by the RAKE receiver 24 and demodulates the signals subjected to secondary demodulation such as PSK. At this moment, the received signals become demodulated data of either 0 or 1 and are output to a channel codec (not shown) in rear of the synchronous demodulator 25.

Meanwhile, a GPS antenna 31 receives a down signal from a GPS satellite (not shown) traveling over the earth, a GPS wireless receiving unit 32 demodulates the down signal, and a GPS signal processing unit 33 calculates position information of a latitude and a longitude. As well known, the GPS can obtain position information on every point on the earth from an atomic clock installed in the GPS satellite and orbital elements of the GPS satellite. The position information calculated by the GPS signal processing unit 33 is input to and used by the CPU 41. --

Column 17 line 60, insert,

-- (Description of operation)

An operation for detecting a moving velocity of the portable wireless terminal 10 having the internal configuration shown in Figs. 2, 3, and 4 will next be described in detail.

First, when the portable wireless terminal 10 starts a communication, the GPS wireless receiving unit 32 and the GPS signal processing unit 33 are turned on. The down signal from the GPS is demodulated using the GPS antenna 31, the GPS wireless receiving unit 32, and the GPS signal processing unit 33, and the position information on the portable wireless terminal 10 is calculated and read by the CPU 41. The CPU 41 stores a position at which the portable wireless terminal 10 is present at the time of starting the communication in storage means (not shown) as an initial position used to calculate a first moving velocity.

Next, it is assumed that the portable wireless terminal 10 is in the state shown in Fig. 1. As shown in Fig. 1, the first base station 11 and the second base station 12 are visible at positions deviated by the elevation angles 01 and 02 from a moving direction of the portable wireless terminal 10, respectively. Therefore, if a target moving velocity of the portable wireless terminal 10 is v, relative velocities v1 and v2 of the portable wireless terminal 10 to the respective base stations can be respectively expressed as:

v1=vcosθ1 v2=vcosθ1.

Physically speaking, the portable wireless terminal 10 is closer to radio wave transmission sources at the relative velocities v1 and v2. Due to this, the portable wireless terminal 10 receives signals with carrier frequency deviated by Doppler shift. In this state, the first secondary demodulator 251 and the second secondary demodulator 252 constituting the synchronous detector 25 perform an operation for correcting a stationary phase rotation caused by carrier shift. By reading information on a correction amount for the stationary phase rotation per unit time, that is, information on a phase rotation velocity of a phase modulation symbol point, the relative velocities v1 and v2 of the portable wireless terminal 10 to the respective base stations can be detected.

If a carrier frequency of a base station is f, a carrier frequency received by the moving portable wireless terminal 10 is f', and a light velocity is c, a relative moving velocity v0 of the portable wireless terminal 10 is calculated as expressed by the following Equation (1) from the Doppler effect formula as well known because the base station is immobile.

$$V_0 = \frac{f - f'}{f \cdot c} \quad (1)$$

This operation is performed on the first base station 11 and the second base station 12, and obtained relative velocities are assumed as v1 and v2 respectively. Namely, by calculating the Doppler effects of the down signals from the respective base stations using the information (carrier frequency f') obtained by the demodulators of the receiving unit, the relative velocities v1 and v2 of the portable wireless terminal 10 to the respective base stations are calculated. --